US012468264B2

(12) United States Patent
Jung

(10) Patent No.: US 12,468,264 B2
(45) Date of Patent: Nov. 11, 2025

(54) COUPLING PIN AND WEARABLE ELECTRONIC DEVICE COMPRISING SAME

(71) Applicant: Samsung Electronics Co., Ltd., Suwon-si (KR)

(72) Inventor: Hyunjun Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

(21) Appl. No.: 18/298,665

(22) Filed: Apr. 11, 2023

(65) Prior Publication Data

US 2023/0244188 A1 Aug. 3, 2023

Related U.S. Application Data

(63) Continuation of application No. PCT/KR2021/000319, filed on Jan. 11, 2021.

(30) Foreign Application Priority Data

Jan. 4, 2021 (KR) ........................ 10-2021-0000290

(51) Int. Cl.
*G04B 37/14* (2006.01)
*G04B 37/16* (2006.01)
*H01R 13/04* (2006.01)

(52) U.S. Cl.
CPC ......... *G04B 37/1486* (2013.01); *G04B 37/16* (2013.01); *H01R 13/04* (2013.01)

(58) Field of Classification Search
CPC ................ G04B 37/1486; G04B 37/16; G04B 37/1493; H01R 13/04; G04G 19/00; G04G 17/06; G04G 9/0064
See application file for complete search history.

(56) References Cited

U.S. PATENT DOCUMENTS 6,014,793 A * 1/2000 Howald ................. A44C 5/147
24/265 B
9,461,386 B1 10/2016 Johns
(Continued)

FOREIGN PATENT DOCUMENTS

KR 10-2001-0106261 A 11/2001
KR 10-2015-0026387 A 3/2015
(Continued)

OTHER PUBLICATIONS

Extended European Search Report dated Jul. 26, 2024, issued in European Patent Application No. 21915360.8-1001.
(Continued)

*Primary Examiner* — Edwin A. Leon
(74) *Attorney, Agent, or Firm* — Jefferson IP Law, LLP

(57) ABSTRACT

A coupling pin and a wearable electronic device in which the coupling pin is configured to connect a wearable member to a housing of the wearable electronic device are provided. The coupling pin includes a tube portion which is configured to be accommodated in the wearable member, and which at least partially has electrical conductivity, a core portion which is configured to protrude from at least one of both ends of the tube portion to be bound to the housing, and which at least partially has electrical conductivity, and a sleeve which is arranged adjacent to the tube portion while surrounding at least a portion of the core portion, and which has electrical conductivity, wherein the sleeve is electrically insulated from the core portion and the tube portion.

19 Claims, 13 Drawing Sheets

(56) References Cited

U.S. PATENT DOCUMENTS

| | | | |
|---|---|---|---|
| 2001/0043514 A1 | 11/2001 | Kita | |
| 2013/0107674 A1 | 5/2013 | Gossweiler, III et al. | |
| 2015/0063075 A1 | 3/2015 | Baek et al. | |
| 2016/0223992 A1 | 8/2016 | Seo et al. | |
| 2016/0363957 A1* | 12/2016 | Stroetmann ............ | G04G 17/06 |
| 2017/0250554 A1 | 8/2017 | Tajima et al. | |
| 2018/0107168 A1 | 4/2018 | Han et al. | |
| 2019/0094809 A1 | 3/2019 | Park et al. | |
| 2019/0221922 A1 | 7/2019 | Ahn et al. | |
| 2020/0096947 A1 | 3/2020 | Thomas et al. | |
| 2020/0192423 A1 | 6/2020 | Hsu et al. | |

FOREIGN PATENT DOCUMENTS

| | | |
|---|---|---|
| KR | 10-2016-0093475 A | 8/2016 |
| KR | 10-2017-0038359 A | 4/2017 |
| KR | 10-2018-0042606 A | 4/2018 |
| KR | 10-2018-0115274 A | 10/2018 |
| KR | 10-2019-0036972 A | 4/2019 |
| KR | 10-2019-0086892 A | 7/2019 |
| KR | 10-2020-0142580 A | 12/2020 |

OTHER PUBLICATIONS

Partial Supplementary European Search Report dated May 2, 2024, issued in European Patent Application No. 21915360.1001.

International Search Report dated Sep. 8, 2021, issued in International Patent Application No. PCT/KR2021/000319.

Korean Office Action dated Jul. 23, 2025, issued in Korean Application No. 10-2021-0000290.

* cited by examiner

COUPLING PIN AND WEARABLE ELECTRONIC DEVICE COMPRISING SAME

CROSS-REFERENCE TO RELATED APPLICATION(S)

This application is a continuation of International Application of an International application No. PCT/KR2021/000319, filed on Jan. 11, 2021, which is based on and claims the benefit of a Korean patent application number 10-2021-0000290, filed on Jan. 4, 2021, in the Korean Intellectual Property Office, the disclosures of which are incorporated by reference herein in their entireties.

BACKGROUND

1. Field

The disclosure relates to an electronic device. More particularly, the disclosure relates to a coupling pin configured to couple a wearable member to a body or a housing, and/or a wearable electronic device including the same.

2. Description of Related Art

In general, electronic devices may refer to devices configured to perform specific functions according to installed programs, such as home appliances, electronic schedulers, portable multimedia players, mobile communication terminals, tablet personal computers (PCs), video/audio devices, desktop/laptop computers, and/or vehicle navigation systems. In line with the high degree of integration of electronic devices and the widespread use of super-fast large-capacity wireless communication, it has recently become possible to equip a single compact electronic device (for example, mobile communication terminal) with various functions. For example, not only a communication function, but also an entertainment function (for example, gaming), a multimedia function (for example, music/video playback), communication and security functions for mobile banking, a scheduling function, and an electronic wallet function may be integrated into a single electronic device.

Recently, wearable electronic devices that can be worn on human bodies have become commercially available, and mobile communication terminals or wearable electronic devices are used in daily life. Wearable electronic devices may maintain contact with users' body for a considerable time, and thus may be useful for medical or health management. For example, an electronic device may detect the user's biometric information, such as photoplethysmography (PPG), sleep ranges, skin temperature, heart rate, or electrocardiogram by using an installed sensor, and the detected biometric information may be stored in the electronic device or transmitted to a medical institution in real time and used to manage the user's health. In general, electronic devices have bar shapes, box shapes, or flat plate shapes, but wearable electronic devices may include multiple segments combined so as to correspond to the curvature of users' body, in view of wearing convenience. For example, a wrist-wearable electronic device may include a housing which contains various kinds of circuit devices and thus plays the role of a body, and at least one wearable member, and a face-wearable electronic device may include lens(es) corresponding to the user's two eyes, and at least one temple bow(s).

The above information is presented as background information only to assist with an understanding of the disclosure. No determination has been made, and no assertion is made, as to whether any of the above might be applicable as prior art with regard to the disclosure.

SUMMARY

A wearable electronic device may be implemented by combining multiple segments which are made compact compared with electronic devices of the related art. For example, by arranging multiple segments which are made compact in conformity with the wearing area or the curvature of the wearing area, the user may feel comfortable when wearing the same. By providing compact segments in which circuit devices or various electric elements are to be disposed, the circuit devices or various electric elements may be appropriately distributed and disposed on respective segments. In connection with combining/connecting respective segments, the wearing convenience may be improved if an appropriate level of flexibility is provided between the segments. However, the flexibility provided between segments may be the cause of damage to connecting wires. For example, wires connecting circuit devices or electric elements that are distributed and disposed may be exposed to repeated bending deformation, and the wires may be fractured by repeated deformation.

Aspects of the disclosure are to address at least the above-mentioned problems and/or disadvantages and to provide at least the advantages described below. Accordingly, an aspect of the disclosure is to provide a coupling pin capable of implementing stable electric wires while coupling different segments, and/or a wearable electronic device including the same.

Another aspect of the disclosure is to provide a coupling pin capable of improving wearing convenience while providing stable electric wires between circuit devices or electric elements which are distributed and disposed on different segments, and/or a wearable electronic device including the same.

Additional aspects will be set forth in part in the description which follows and, in part, will be apparent from the description, or may be learned by practice of the presented embodiments.

In accordance with an aspect of the disclosure, a coupling pin configured to connect a wearing member to a housing of a wearable electronic device is provided. The coupling pin and the wearable electronic device including the same include a tube portion configured to be accommodated in the wearing member and at least partially having electrical conductivity, a core portion configured to protrude from at least one of opposite ends of the tube portion to be bound to the housing and at least partially having electrical conductivity, and a sleeve disposed adjacent to the tube portion in a state of surrounding at least a portion of the core portion and having electrical conductivity, wherein the sleeve may be electrically insulated from the core portion and the tube portion, and wherein at least one of the core portion and the sleeve may be configured to transmit an electric signal or power between the wearing member and the housing.

In accordance with another aspect of the disclosure, a wearable electronic device is provided. The wearable electronic device includes a housing, a circuit device accommodated in the housing, at least one wearing member detachably coupled to at least a part of the housing and configured to enable the housing to be worn on a part of the user's body, at least one electrical component disposed in the wearing member, and a coupling pin which is accommodated in the wearing member and a part of which is bound to the housing to enable the wearing member to be detachably coupled to the housing, wherein the coupling pin may be configured to transmit an electric signal or power between the circuit device and the electrical component.

According to various embodiments disclosed herein, a coupling pin may couple different segments (for example, a housing that constitutes the body, and at least one wearable member) so as to have flexibility and/or to be able to rotate with regard to each other, thereby improving convenience or comfortableness during wearing. In an embodiment of the disclosure, the coupling pin may serve as an electric wire, thereby implementing a stable electric connection structure between circuit devices or electric elements which are distributed and disposed on different segments. Various other advantageous effects identified explicitly or implicitly through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
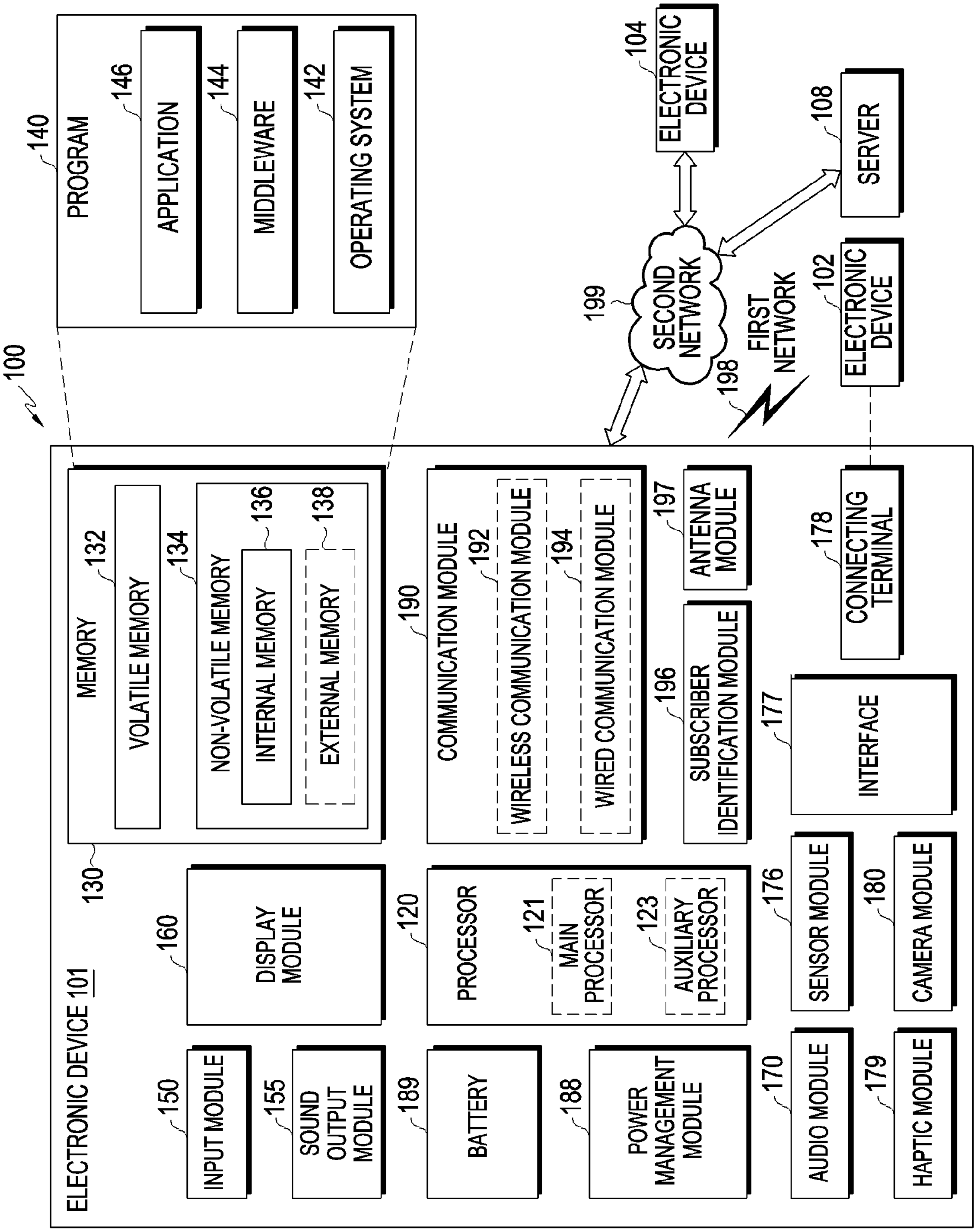
FIG. 1 is a block diagram illustrating an electronic device within a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out successively, in parallel, repeatedly, or heuristically, or one or more of the operations may be executed in a different order or omitted, or one or more other operations may be added.

Figure 2:
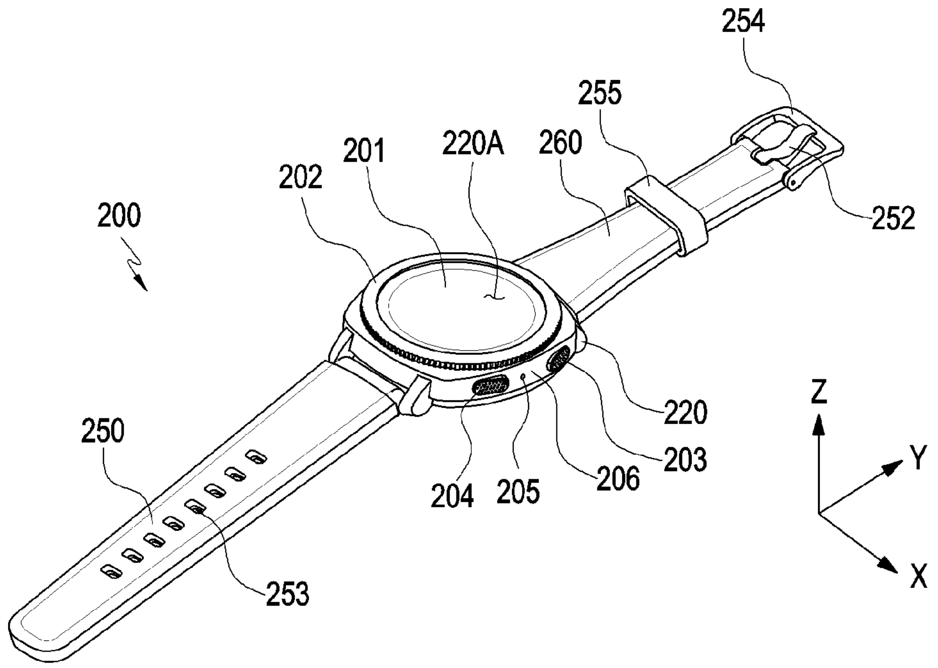
FIG. 2 is a front perspective view illustrating an electronic device according to an embodiment of the disclosure.

FIG. 2 is a front perspective view illustrating an electronic device according to an embodiment of the disclosure. FIG.

3 is a rear perspective view illustrating an electronic device 200 of FIG. 2 according to an embodiment of the disclosure.

Referring to FIG. 2, in the detailed description below, the X-axis direction may indicate the widthwise direction of an electronic device 200 or a housing 220, and the Y-axis direction may indicate the lengthwise direction of the electronic device 200 or the housing 220, and the Z-axis direction may indicate the thickness direction of the electronic device 200 or the housing 220, in orthogonal coordinates of FIGS. 2 to 4. In an embodiment of the disclosure, a direction in which a front surface (e.g., a first surface 220A of FIG. 2) of the electronic device 200 or the housing 220 is oriented may be defined as a first direction or the +Z direction, and a direction in which a rear surface (e.g., a second surface 220B of FIG. 3) of the electronic device 200 or the housing 220 is oriented may be defined as a second direction or the −Z direction.

Figure 3:
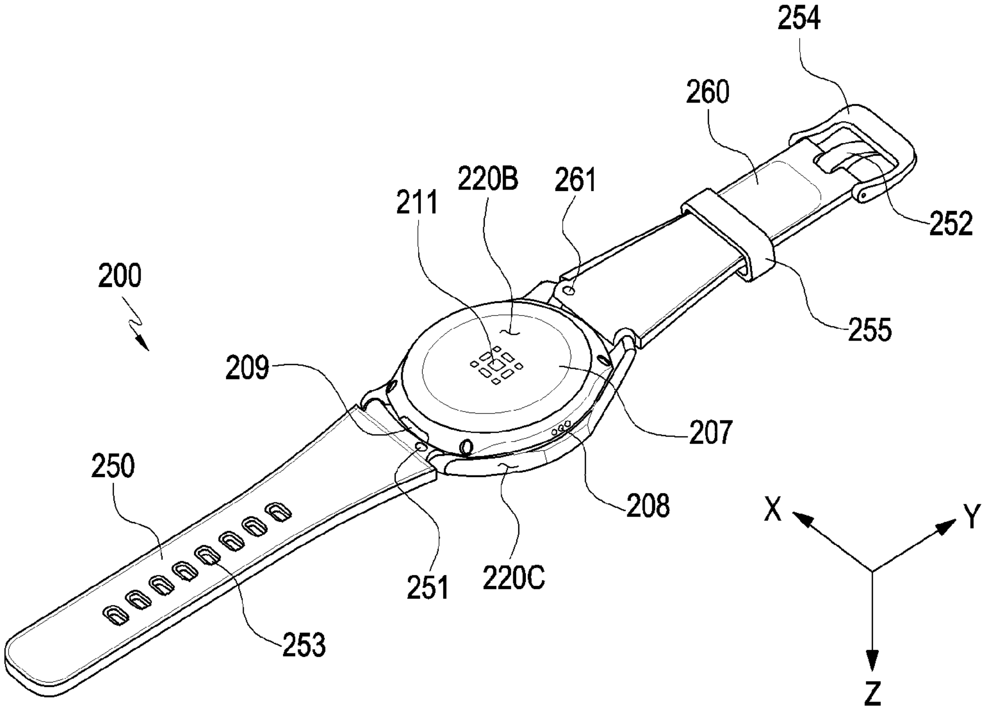
FIG. 3 is a rear perspective view illustrating an electronic device of FIG. 2 according to an embodiment of the disclosure.

Referring to FIGS. 2 and 3, the electronic device 200 according to an embodiment may include a housing 220 including the first surface 220A (or front surface), the second surface 220B (or rear surface), and a side surface 220C surrounding a space between the first surface 220A and the second surface 220B, and wearing members 250 and 260 connected to at least a part of the housing 220 and configured such that the electronic device 200 is detachably coupled to a part of the user's body (e.g., the wrist, the ankle, and so on). In another embodiment (not illustrated), the housing may refer to a structure of configuring a part of the first surface 220A, the second surface 220B, and the side surface 220C of FIG. 2. According to an embodiment of the disclosure, at least a part of the first surface 220A may be configured by a front surface plate 201 (e.g., a glass plate including various coating layers or a polymer plate) which is substantially transparent. The second surface 220B may be configured by a rear surface plate 207 which is substantially opaque. In an embodiment of the disclosure, when the electronic device includes a sensor module 211 disposed on the second surface 220B, the rear surface plate 207 may include at least partially transparent area. The rear surface plate 207 may be made of, for example, coated or colored glass, ceramic, a polymer, a metal (e.g., aluminum, stainless steel (STS), or magnesium), or a combination of at least two thereof. The side surface 220C may be coupled to the front surface plate 201 and the rear surface plate 207 and configured by a side surface bezel structure 206 (or a side surface member) including a metal and/or a polymer. In an embodiment of the disclosure, the rear surface plate 207 and the side surface bezel structure 206 may be integrally configured and may include the same material (e.g., a metal material, such as aluminum). The wearing members 250 and 260 may be made of various materials and configured in various shapes. Integrated and multiple unit links may be configured to be movable by a weaving material, leather, rubber, urethane, a metal, ceramic, or a combination of at least two thereof.

According to an embodiment of the disclosure, the electronic device 200 may include at least one of a display 320 (refer to FIG. 4), audio modules 205, 208, the sensor module 211, key input devices 202, 203, 204, and a connector hole 209. In an embodiment of the disclosure, the electronic device 200 may omit at least one of the components (e.g., the key input devices 202, 203, 204, the connector hole 209 or the sensor module 211) or may additionally include another component.

The display (e.g., the display 320 of FIG. 4) may be exposed through the majority part of the front surface plate 201. A shape of the display 320 may be a shape corresponding to a shape of the front surface plate 201, and may be various shapes, such as a circle, an oval, or a polygon. The display 320 may be coupled to or disposed adjacent to a touch sensing circuit, a pressure sensor capable of measuring strength (pressure) of a touch, and/or a fingerprint sensor.

The audio modules 205, 208 may include the microphone hole 205 and a speaker hole 208. A microphone for obtaining an external sound may be disposed inside the microphone hole 205, and in an embodiment of the disclosure, a plurality of microphones may be disposed to detect a direction of a sound. The speaker hole 208 may be used as an external speaker and a call receiver. In an embodiment of the disclosure, a speaker without a speaker hole may be included (e.g., piezo speaker).

The sensor module 211 may generate a data value or an electric signal corresponding to an external environment state or an internal operation state of the electronic device 200. The sensor module 211 may include, for example, a biometric sensor module 211 (e.g., HRM sensor) disposed on the second surface 220B of the housing 220. The electronic device 200 may further include a sensor module (not illustrated), for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The key input devices 202, 203, 204 may include the wheel key 202 disposed on the first surface 220A of the housing 220 and rotatable in at least one direction and/or side key buttons 203, 204 disposed on the side surface 220C of the housing 220. The wheel key may have a shape corresponding to a shape of the front surface plate 201. In another embodiment of the disclosure, the electronic device 200 may not include a part of or all the key input devices 202, 203, 204 described above, and the key input devices 202, 203, 204 which are not included may be implemented on the display 320 in another shape, such as a soft key and so on. The connector hole 209 may include another connector hole (not illustrate) capable of accommodating a connector (e.g., USB connector) for transmitting/receiving power and/or data to/from an external electronic device and capable of accommodating a connector for transmitting/receiving an audio signal to/from an external electronic device. The electronic device 200 may further include, for example, a connector cover (not illustrated) which covers at least a part of the connector hole 209 and blocks introduction of external foreign materials with respect to the connector hole.

The wearing members 250, 260 may be detachably coupled to at least a part of the housing 220 by using locking members 251, 261. The locking members 251, 261 may include components for binding, such as a pogo pin, and may be substituted with a protrusion(s) or a recess(es) configured in the wearing members 250, 260 according to an embodiment. For example, the wearing members 250, 260 may be coupled through engagement to a recess or a protrusion configured in the housing 220. The wearing members 250, 260 may include one or more of a holding member 252, a holding member fastening hole 253, a band guide member 254, a band holding ring 255.

The holding member 252 may be configured to hold the housing 220 and the wearing members 250, 260 to a part of the user's body (e.g., the wrist, the ankle, and so on). The holding member fastening hole 253 may hold the housing 220 and the wearing members 250, 260 to a part of the user's body corresponding to the holding member 252. The band guide member 254 is configured to limit a movement range of the holding member 252 when the holding member 252 is fastened to the holding member fastening hole 253, so that the wearing members 250, 260 may be in close contact with a part of the user's body to be coupled thereto. The band holding ring 255 may limit a movement range of the wearing members 250, 260 in a state where the holding member 252 is fastened to the holding member fastening hole 253.

Figure 4:
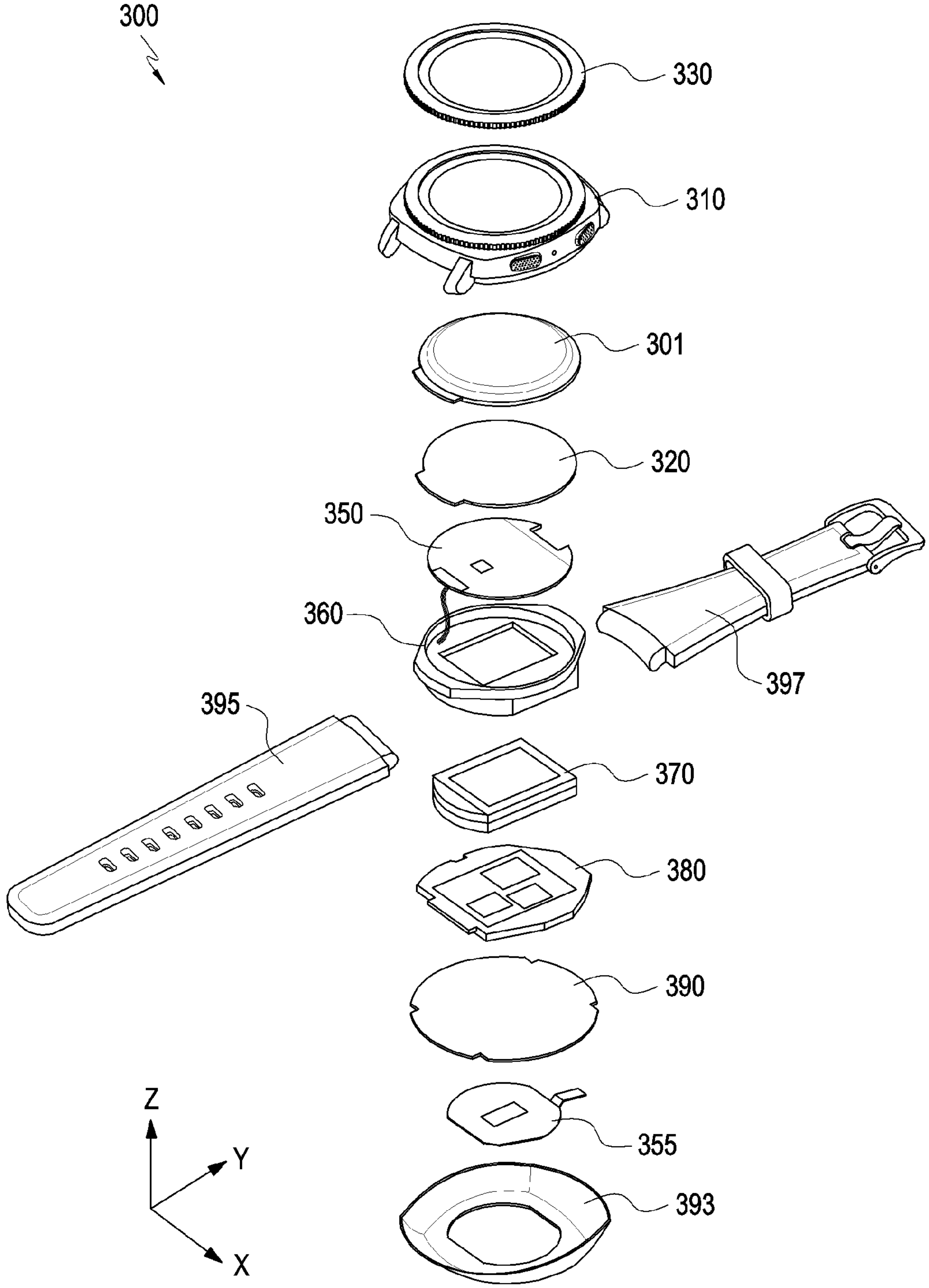
FIG. 4 is an exploded perspective view illustrating an electronic device of FIG. 2 according to an embodiment of the disclosure.

FIG. 4 is an exploded perspective view illustrating an electronic device of FIG. 2 according to an embodiment of the disclosure.

Referring to FIG. 4, an electronic device 300 may include a side surface bezel structure 310, a wheel key 330, a front surface plate 301 (e.g., the front surface plate 201 of FIG. 2), the display 320, a first antenna 350, a second antenna (e.g., an antenna included in a second circuit board 355), a support member 360 (e.g., a bracket), a battery 370, a printed circuit board 380, a sealing member 390, a rear surface plate 393, and wearing members 395, 397. At least one of components of the electronic device 300 may be identical or similar to at least one of components of the electronic device 200 of FIG. 2 or 3, and redundant explanations will be omitted below. The support member 360 may be disposed in the electronic device 300 to be connected to the side surface bezel structure 310, or may be integrally configured with the side surface bezel structure 310. The support member 360 may be made of, for example, a metal material and/or a non-metal (e.g., a polymer) material. The display 320 may be coupled to one surface of the support member 360, and the printed circuit board 380 may be coupled to the other surface thereof. The processor, the memory and/or the interface may be mounted in the printed circuit board 380. The processor may include, for example, one or more of a central processing unit, an application processor, a graphic processing unit (GPU), an application processor, a sensor processor, or a communication processor.

The memory may include, for example, a volatile memory or a non-volatile memory. The interface may include, for example, a high definition multimedia interface (HDMI), a universal serial bus (USB) interface, an SD card interface, and/or an audio interface. The interface may electrically or physically connect the electronic device 300 to the external electronic device, and may include a USB connector, an SD card/MMC connector, or an audio connector.

The battery 370 is a device for suppling power to at least one component of the electronic device 300, and may include, for example, a non-rechargeable primary battery, a rechargeable secondary battery, or a fuel cell. At least a part of the battery 370 may be disposed on, for example, a substantially identical plane with the printed circuit board 380. The battery 370 may be integrally disposed in the electronic device 300, or disposed to be attachable to or detachable from the electronic device 300.

The first antenna 350 may be disposed between the display 320 and the support member 360. The first antenna 350 may include, for example, a near field communication (NFC) antenna, a wireless charging antenna, and/or a magnetic secure transmission (MST) antenna. The first antenna 350 may perform, for example, a near field communication with an external device, or wirelessly transmit or receive power necessary to charging, and transmit a magnetic-based signal including a near field communication signal or payment data. In another embodiment of the disclosure, an antenna structure may be configured by a part of the side surface bezel structure 310 and/or the support member 360, or a combination thereof.

The second circuit board 355 may be disposed between the circuit board 380 and the rear surface plate 393. The second circuit board 355 may include an antenna, for example, a near field communication (NFC) antenna, a wireless charging antenna, and/or a magnetic secure transmission (MST) antenna. The second circuit board 355 may perform, for example, a near field communication with an external device, or wirelessly transmit or receive power necessary to charging, and transmit a magnetic-based signal including a near field communication signal or payment data. In another embodiment of the disclosure, an antenna structure may be configured by a part of the side surface bezel structure 310 and/or the rear surface plate 393, or a combination thereof. In various embodiments of the disclosure, when the electronic device 300 (e.g., the electronic device 200 of FIGS. 2 and 3) includes a sensor module (e.g., the sensor module 211 of FIG. 2), a sensor circuit disposed on the second circuit board 355 or a sensor element (e.g., a photoelectric conversion element or an electrode pad) separate from the second circuit board 355 may be disposed. For example, an electronic component provided as the sensor module 211 may be disposed between the circuit board 380 and the rear surface plate 393.

The sealing member 390 may be disposed between the side surface bezel structure 310 and the rear surface plate 393. The sealing member 390 may be configured to block moisture and foreign materials introduced from the outside into a space surrounded by the side surface bezel structure 310 and the rear surface plate 393.

Figure 5:
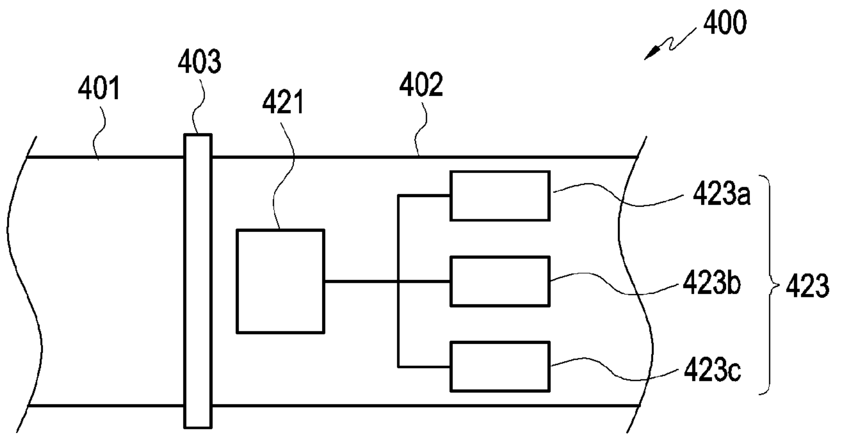
FIG. 5 is a view illustrating a configuration of an electronic device according to an embodiment of the disclosure.
Figure 6:
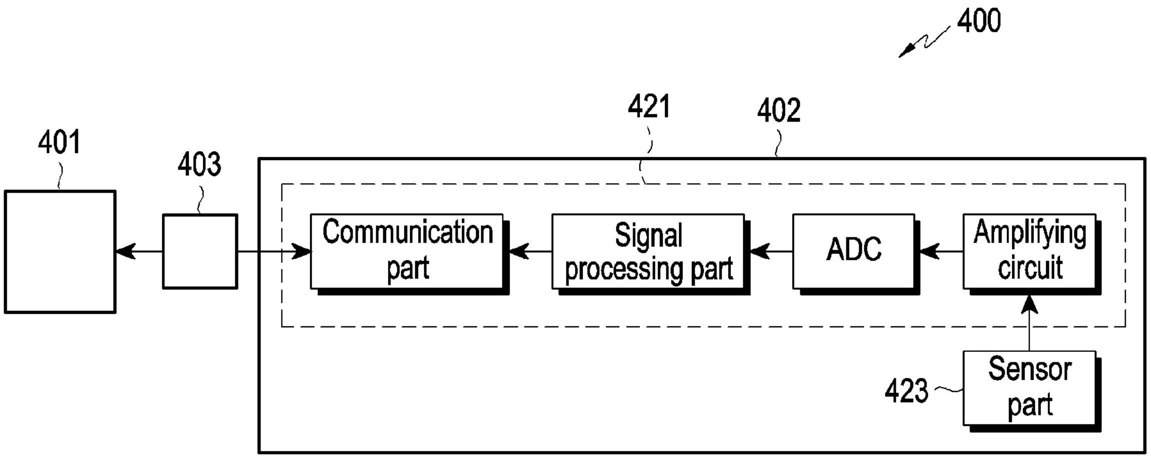
FIG. 6 is a block diagram illustrating an electronic device according to an embodiment of the disclosure.

FIG. 5 is a view illustrating a configuration of an electronic device according to an embodiment of the disclosure. FIG. 6 is a block diagram illustrating an electronic device 400 according to an embodiment of the disclosure.

Referring to FIGS. 5 and 6, an electronic device 400 may include a housing 401 (e.g., the housing 220 of FIG. 2 and/or the side surface bezel structure 310 of FIG. 3), at least one wearing member 402 (e.g., the wearing members 250, 260, 395, 397 of FIGS. 2 to 4) and/or a coupling pin 403 to enable the wearing member 402 to be detachably coupled to the housing 401. In an embodiment of the disclosure, the coupling pin 403 may function as a connector and/or a wire providing an electrical connection between the housing 401 and the wearing member(s) 402. The housing 401 may accommodate various circuit devices, for example, such as the processor 120, the communication module 190, the memory 130, the battery 189 and/or the power management module 188 of FIG. 1, and at least a part of various circuit devices may be provided at the printed circuit board 380 of FIG. 4. The wearing member 402 may be detachably coupled to at least a part of the housing 401 by the coupling pin 403, and a user may wear the electronic device 400 and/or the housing 401 on a part of the user's body by using the wearing member 402. For example, the electronic device 400 may be the wearable electronic device.

According to various embodiments of the disclosure, the electronic device 400 may include at least one electrical component disposed in the wearing member 402. The electrical component may include, for example, an integrated circuit chip 421, various sensors 423*a*, 423*b*, 423*c* (e.g., a sensor part 423), a probe for the sensor, or an electrode pad (not illustrated). The sensor part 423 may include, for example, an optical sensor 423*a* for measuring photoplethysmography (PPG), heartbeat, or oxygen saturation, an electric sensor 423*b* for measuring electrocardiogram, electrodermal activity (or galvanic skin response) or bioimpedance, and/or a chemical sensor 423*c* for detecting a biological secretion. The sensors 423*a*, 423*b*, 423*c* may be disposed to be exposed to a position to be in contact with the skin of a user, for example, the outside of the wearing member 402. The expression "disposed to be exposed to the outside of the wearing member 402" may imply that the probe for the sensor or the electrode pad is disposed to face or come into contact with the skin of the user, instead of implying that all of the sensor part 423 or the sensors 423*a*, 423*b*, 423*c* are exposed to the external space. In an embodiment of the disclosure, when the electronic device 400 includes one pair of wearing members 402, the sensors 423*a*, 423*b*, 423*c* may be disposed in one of the one pair of wearing members 402 or dispersed and disposed in the one pair of the wearing members 402.

According to various embodiments of the disclosure, the integrated circuit chip 421 may include a communication part, a signal processing unit, an analog-digital converter (ADC), and/or an amplifying circuit, may amplify and/or process a signal or information detected through the sensor part 423 to transmit the same to a circuit device (e.g., the processor 120 or the memory 130 of FIG. 1) in the housing 401. In an embodiment of the disclosure, the transmission of the detected signal or information may be performed by a wireless scheme and/or a wired scheme. In case that the signal or information is transmitted by a wired scheme, the coupling pin 403 may function as an electric wire between the circuit device in the housing 401 and the electrical component disposed in the wearing member(s) 402. For example, the coupling pin 403 may provide an electrical connection means between the circuit device in the housing 401 and the electrical component disposed in the wearing member(s) 402 while providing a mechanical coupling means between the wearing member 402 and the housing 401.

Hereinafter, the configuration of the coupling pin 403 providing the mechanical coupling means will be described through an embodiment of FIGS. 7 and 8, and the configuration of the coupling pin 403 providing an electrical connection means will be described through FIGS. 9 to 12. In the following discussion on various embodiments related to the coupling pin 403, the external electronic devices 101, 102, 104, 200, 300, 400 of FIGS. 1 to 6 may be discussed together.

Figure 7:
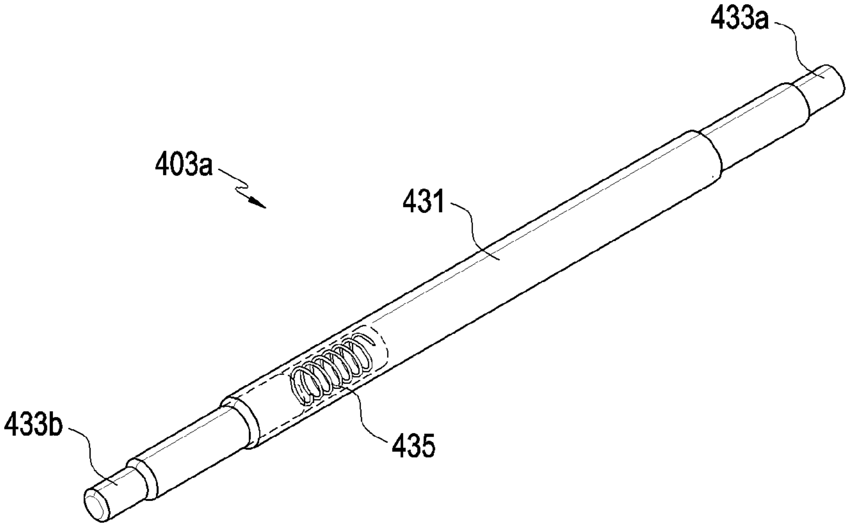
FIG. 7 is a view illustrating a coupling pin of an electronic device according to an embodiment of the disclosure.

FIG. 7 is a view illustrating a coupling pin 403*a* (e.g., the coupling pin 403 of FIG. 5 or 6) of an electronic device (e.g., the electronic device 400 of FIG. 5 or 6) according to an embodiment of the disclosure.

Referring to FIG. 7, the coupling pin 403*a* may include a tube portion 431 and core portions 433*a*, 433*b* provided at opposite ends of the tube portion 431. The core portions 433*a*, 433*b* may have the diameter smaller than that of the tube portion 431 to be at least partially accommodated in the tube portion 431, and may be disposed to be protrudable from the opposite ends of the tube portion 431. For example, an elastic member 435 may be disposed in the tube portion 431 to provide the elastic force applied in a direction in which the core portions 433*a*, 433*b* protrude from the end of the tube portion 431. In the embodiment of the disclosure, the first core portion 433*a* may be disposed in a state of being held at one end of the tube portion 431, and the second core portion 433*b* may be disposed to be protrudable from the other end of the tube portion 431. The first core portion 433*a* may be held in a state of protruding from one end of the tube portion 431 and the second core portion 433*b* may be maintained in a state of protruding from the other end of the tube portion 431 by the elastic force of the elastic member 435. In an embodiment of the disclosure, the first core portion 433*a* may be made of a material substantially identical to the tube portion 431, for example, may be integrally configured therewith, and the second core portion 433*b* may linearly reciprocate in the lengthwise direction in a state of being at least partially accommodated in the tube portion 431.

According to various embodiments of the disclosure, the coupling pin 403*a* may be accommodated in one of the wearing members 402, and the core portions 433*a*, 433*b* may protrude out of the wearing member 402. In an embodiment of the disclosure, the coupling pin 403*a* may be disposed between the coupling protrusions (e.g., a coupling protrusion 411 of FIG. 11) configured on the housing 401 (e.g., the housing 220 of FIG. 2 or the side surface bezel structure 310 of FIG. 3). For example, the first core portion 433*a* may be disposed to be engaged with one of the coupling protrusions 411, and the second core portion 433*b* may be disposed to be engaged with the other one of the coupling protrusions 411. When the coupling pin 403*a* enters between the coupling protrusions 411 and reaches into the coupling portion in a state in which the second core portion 433*b* is accommodated in the tube portion 431, the second core portion 433*b* may be engaged with one of the coupling protrusions 411 while protruding from the end of the tube portion 431. For example, the second core portion 433*b* may be disposed to be protrudable from the tube portion 431, so that the coupling pin 403*a* may be easily coupled to the housing 401. In an embodiment of the disclosure, while the coupling pin 403*a* enters between the coupling protrusions 411, the first core portion 433*a* may be in a state of being already engaged with the coupling hole (e.g., a coupling hole 413 of FIG. 11) configured in one of the coupling protrusion 411. The core portions 433*a*, 433*b* are engaged with the coupling protrusions 411 in a state in which the coupling pin 403*a* is accommodated in one of the wearing members 402, so that the wearing member 402 may be engaged with the housing 401.

According to various embodiments of the disclosure, the wearing member 402 may rotate about the coupling pin 403*a* with respect to the housing 401. For example, an inclination angle or a relative position of the wearing member 402 with respect to the housing 401 may be variously controlled. Therefore, in a state where a space configured by the housing 401 and the wearing member 402 is sufficiently secured, a user may comfortably wear the electronic device 400. In another embodiment of the disclosure, even though difference of wearing comfort may occur since a circumference size of the wrist differs according to a user, in the electronic device 400 according to various embodiments described in the document, the housing 401 and the wearing member 402 rotate with regard to each other, to be arranged at an angle position suitable for a curve of the user's body or the body part on which the electronic device is to be worn. For example, regardless of the difference of the curve of the body or the size of the wearing part, the electronic device 400 may provide comfortable wearing comfort.

According to various embodiments of the disclosure, when the second core portion 433*b* enters into the tube portion 431 by using a separate tool, the second core portion 433*b* may be separated from the coupling protrusion 411. For example, when the wearing member 402 is separated from the housing 401, a separate tool (not illustrated) may be used. Therefore, a user may select the wearing member 402 having a desired shape or color and may couple the same to the housing.

In the embodiment of the disclosure, a structure in which the first core portion 433*a* is held on the tube portion 431 and the second core portion 433*b* receives the elastic force and is disposed to be protrudable from the end of the tube portion 431 is described as an example. However, it should be noted that various embodiments of the disclosure described in the document are not limited to the described example. For example, the first core portion 433*a* may be disposed to be protrudable from the tube portion 431, and in another embodiment of the disclosure, when an interval between the coupling protrusions 411 of the housing 401 is controllably provided, both the first core portion 433*a* and the second core portion 433*b* are held on the tube portion 431.

Figure 8:
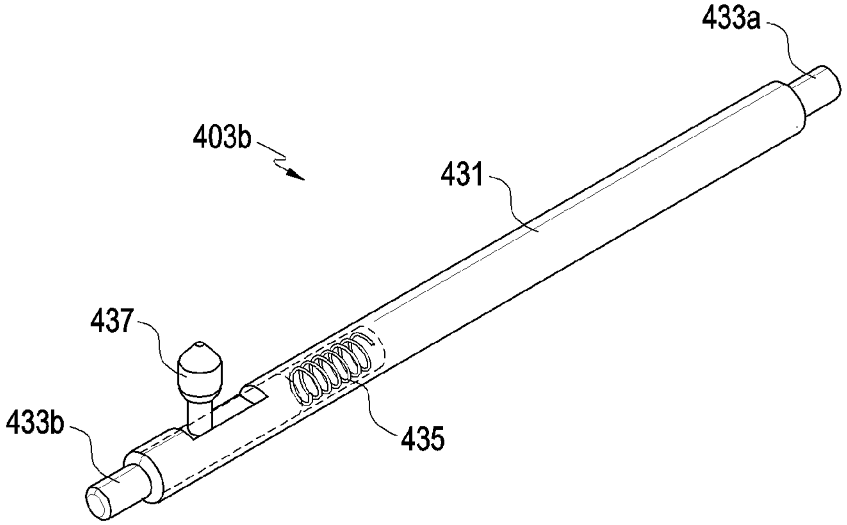
FIG. 8 is a view illustrating a coupling pin of an electronic device according to an embodiment of the disclosure.

FIG. 8 is a view illustrating a coupling pin of an electronic device according to an embodiment of the disclosure.

Referring to FIG. 8, the coupling pin 403*b* may differ from the embodiment of FIG. 7 in that a controlling handle 437 disposed on the second core portion 433*b* is further included, and the remaining configuration may be equal to the embodiment of FIG. 7. Therefore, regarding the embodiment of the disclosure, the configuration of the controlling handle 437 will be further described. In an embodiment of the disclosure, the controlling handle 437 may extend through the tube portion 431 and be coupled to the second core portion 433*b* in the inner space of the tube portion 431. The tube portion 431 may include an opening corresponding to a section in which the second core portion 433*b* linearly reciprocates, and the controlling handle 437 may be coupled to the second core portion 433*b* through the opening in a direction substantially perpendicular to the linear reciprocation direction of the second core portion 433*b*. In an embodiment of the disclosure, a user may enable the second core portion 433*b* to be linearly reciprocated by using the controlling handle 437 without using a separate tool. For example, the coupling pin 403*b* of the embodiment may include the coupling handle 437 to enable the wearing member 402 to be coupled to the housing 401 or to be easily separated from the housing 401.

Figure 9:
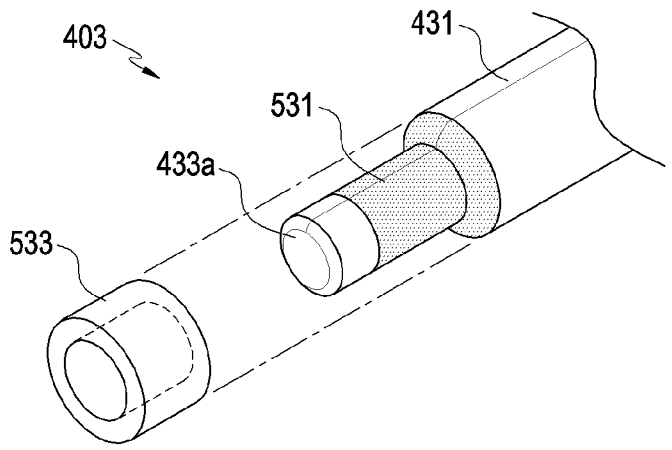
FIG. 9 is an exploded perspective view illustrating an electric wire implemented in a coupling pin of an electronic device according to an embodiment of the disclosure.
Figure 10:
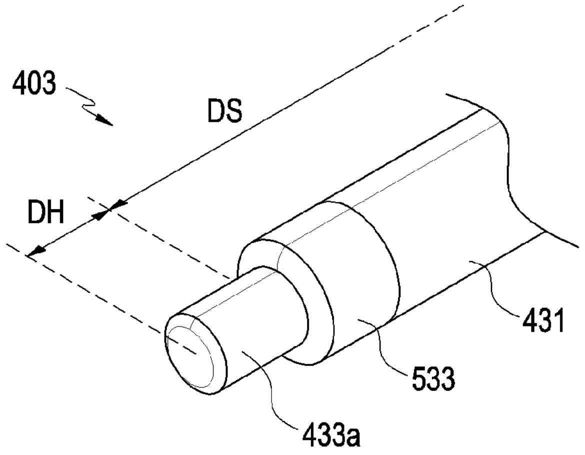
FIG. 10 is a perspective view illustrating a coupling pin of FIG. 9 according to an embodiment of the disclosure.

FIG. 9 is an exploded perspective view illustrating an electric wire implemented in a coupling pin of an electronic device according to an embodiment of the disclosure. FIG. 10 is a perspective view illustrating a coupling pin of FIG. 9 according to an embodiment of the disclosure.

In the embodiment of the disclosure, referring to a core portion (e.g., the first core portion 433*a* of FIG. 7 or 8) held on the tube portion 431, the configuration providing an electrical connection means will be described below. However, various embodiments described in the document are not limited thereto, and the configuration in which the core portion (e.g., the second core portion 433*b* of FIG. 7 or 8) disposed to be protrudable from the tube portion 431 provides an electrical connection means as below may be implemented.

Referring to FIGS. 9 and 10, the coupling pin 403 (e.g., the coupling pins 403*a*, 403*b* of FIGS. 7 and/or 8) may include the tube portion 431, the first core portion 433*a* and/or a sleeve 433. The tube portion 431 and the first core portion 433*a* may at least partially include an electrical conductivity material to be substantially integrally manufactured. A sleeve 533 may be disposed adjacent to the tube portion 431 in a state of at least partially surrounding the first core portion 433*a*, and may include an electrical conductivity material. For example, the sleeve 533 may be provided in a ring shape or a tube shape to surround the first core portion 433*a*. In an embodiment of the disclosure, the coupling pin 403 may include an insulation coating layer 531 configured on at least a part of the surfaces of the first core portion 433*a* and the tube portion 431, and the sleeve 533 may be electrically insulated from the tube portion 431 and/or the first core portion 433*a* by the insulation coating layer 531.

According to various embodiments of the disclosure, the coupling pin 403 may be described by distinguishing a receiving part (DS) and a connection part (DH). For example, the tube portion 431 and the sleeve 533 may be substantially accommodated in the wearing member 402, and a part of the coupling pin 403 accommodated in the wearing member 402 may be defined as the receiving part (DS). The housing 401 side of the coupling pin 403, for example, a part directly coming into contact with the coupling protrusion 411 of FIG. 11 may be defined as the connection part (DH), and the connection part (DH) may include a part of the first core portion 433*a* exposed to the external space of the wearing member 402 and one end surface of the sleeve 533. In an embodiment of the disclosure, the sleeve 533 is electrically insulated from the tube portion 431 and/or the first core portion 433*a*, such that the tube portion 431 and the first core portion 433*a* are combined to be used as one electric wire between the housing 401 and the wearing member 402 and the sleeve 533 may be used as an additional electric wire between the housing 401 and the wearing member 402. Herein, the expression "used as the (additional) electric wire between the housing 401 and the wearing member 402" may imply that a combination of the tube portion 431 and the first core portion 433*a* and/or the sleeve 533 is configured to transmit an electric signal and/or power between the circuit device accommodated in the housing 401 and the electrical component(s) disposed in the wearing member 402.

According to various embodiments of the disclosure, the coupling pin 403 may provide a connection structure, for example, a coaxial cable and/or a coaxial connector structure. For example, the sleeve 533 may operate as an outer conductor, and the first core portion 433*a* surrounded by the sleeve 533 may operate as an inner conductor. When the sleeve 533 and the first core portion 433*a* are disposed in a shape of the coaxial cable and/or the coaxial connector, the tube portion 431 which is integrally configured with the first core portion 433*a* may be interpreted as the inner conductor. Therefore, in the detailed description below, the core portion or the first core portion 433*a* configured to transmit an electric signal and/or power may be interpreted as the meaning of including the combination of the tube portion 431 and the first core portion 433*a* of FIG. 9.

According to various embodiments of the disclosure, in a state where the coupling pin 403 is accommodated in the wearing member 402, at least a portion of the first core portion 433*a* may protrude out of the wearing member 402, and at least a part of the surface of the sleeve 533, for example, one end surface configuring the boundary of the connection part (DH) and the receiving part (DS) may be exposed to the outside of the wearing member 402. For example, the end surface of the first core portion 433*a* and the sleeve 533 may be disposed to be contactable with the external object or the structure (e.g., connection pads 415*a*, 415*b* of FIG. 11).

Figure 11:
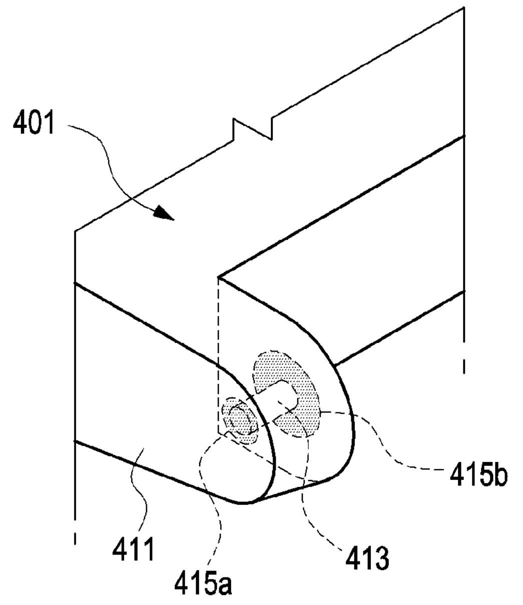
FIG. 11 is a partial enlarged view of a housing of an electronic device according to an embodiment of the disclosure.
Figure 12:
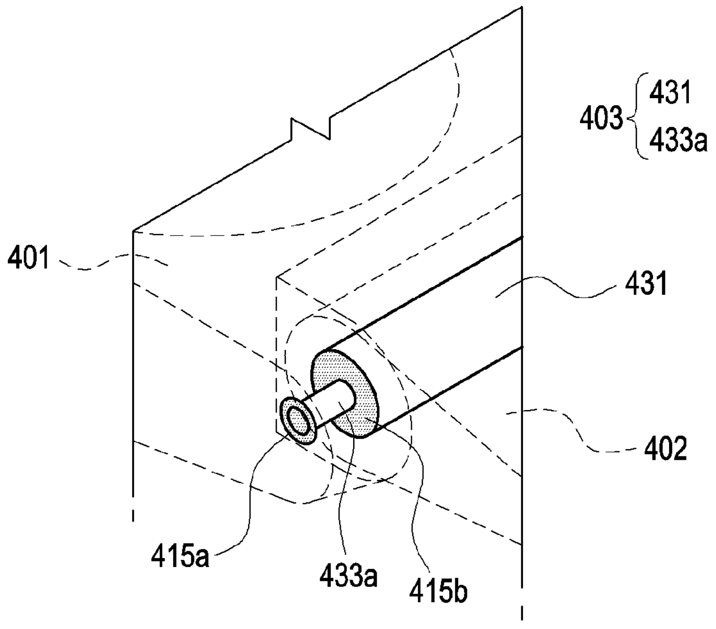
FIG. 12 is a view illustrating a configuration in which a coupling pin of an electronic device according to an embodiment of the disclosure.

FIG. 11 is a partial enlarged view of a housing of an electronic device according to an embodiment of the disclosure. FIG. 12 is a view illustrating a configuration in which a coupling pin a of an electronic device according to an embodiment of the disclosure.

Referring to FIG. 11, the housing 401 may include the coupling protrusions 411 as a means for binding the wearing member 402. For example, the first core portion 433*a* and the second core portion 433*b* may protrude out of the wearing member 402, and the housing 401 may include the coupling protrusions 411 corresponding to the core portions 433*a*, 433*b*, respectively. The coupling protrusion 411 may include the coupling hole 413 accommodating one of the first core portion 433*a* and the second core portion 433*b*. For example, the first core portion 433*a* and the second core portion 433*b* may be engaged with one of the coupling protrusions 411 to be held through the coupling hole(s) 413. In an embodiment of the disclosure, at least one of the coupling protrusions 411 may include the connection pad(s) 415*a*, 415*b* corresponding to the first core portion 433*a* and/or the sleeve 533. For example, the first connection pad 415*a* is disposed in the coupling protrusion 411, and the second connection pad 415*b* may be disposed on the surface of the coupling protrusion 411. In an embodiment of the disclosure, the first connection pad 415*a* may be disposed in a state of closing one end of the coupling hole 413, and the second connection pad 415*b* may be disposed at the circumference of the coupling hole 413. Even though not illustrated, the connection pads 415*a*, 415*b* may be electrically connected to the circuit device (e.g., the processor 120, the memory 130, the communication module 190 and/or the battery 189 of FIG. 1) and/or a printed circuit board (e.g., the printed circuit board 380 of FIG. 4) through signal lines provided in the housing 401.

Referring to FIG. 12, the first core portion 433*a* is accommodated in the coupling hole 413 to enable the wearing member 402 to be coupled to the housing 401. In a state where the wearing member 402 is coupled to the housing 401, the first core portion 433*a* may come into contact with the first connection pad 415*a*, and the sleeve 533 may come into contact with the second connection pad 415*b*. For example, the coupling pin 403 may operate as a connection device (e.g., connector) between the housing 401 and the wearing member 402. In an embodiment of the disclosure, the coupling pin 403 (e.g., the sleeve 533 and the first core portion 433*a*) may be electrically connected to various electrical components (e.g., the integrated circuit chip 421 and/or the sensor part 423 of FIGS. 4 and 5) in the wearing member 402. For example, the electrical component(s) in the wearing member 402 may be electrically connected to the circuit devices in the housing 401 through the coupling pin 403. The coupling pin 403 is a structure for substantially providing a means by which the wearing member 402 is rotatably coupled to the housing 401, and the coupling pin 403 may be configured to transmit an electric signal and/or power between the circuit devices in the housing 401 and the electrical component(s) disposed in the wearing member 402. According to an embodiment of the disclosure, an electric wire may be implemented as the coupling pin 403 by itself and/or in the coupling pin 403, so that an external force may not be substantially applied to the electric wire even though there is a relative movement between different segments (e.g., the housing 401 and the wearing members 402). For example, while sufficient flexibility between different segments is secured so that the wearable electronic device (e.g., the external electronic devices 101, 102, 104, 200, 300, 400 of FIGS. 1 to 6) may provide convenience of wear, a stable electric wire between the electrical components or the circuit devices disposed in different segments may be provided.

Figure 13:
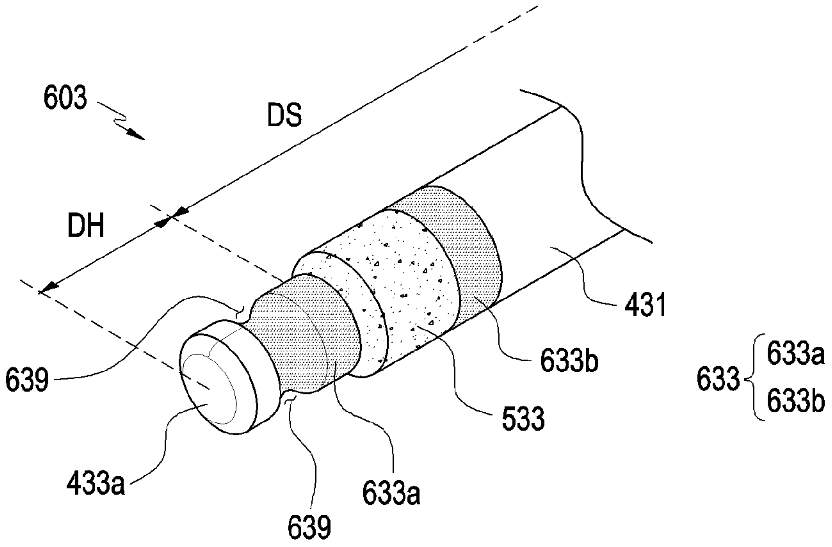
FIG. 13 is a perspective view illustrating a coupling pin of an electronic device according to an embodiment of the disclosure.
Figure 14:
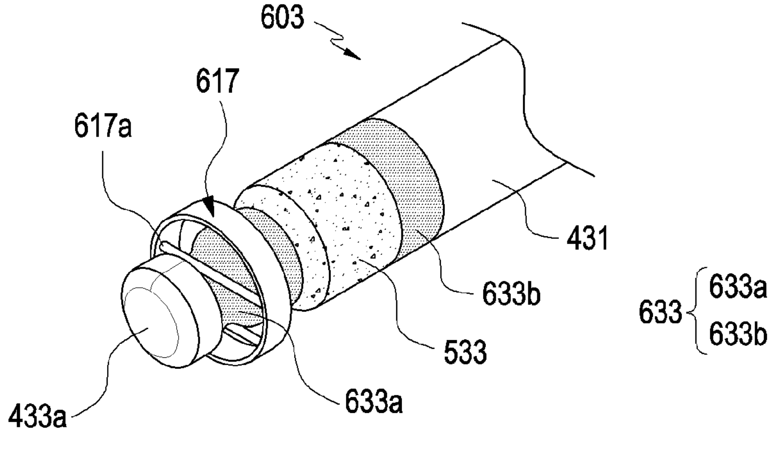
FIG. 14 is a view illustrating a configuration in which a coupling pin of an electronic device according to an embodiment of the disclosure.
Figure 15:
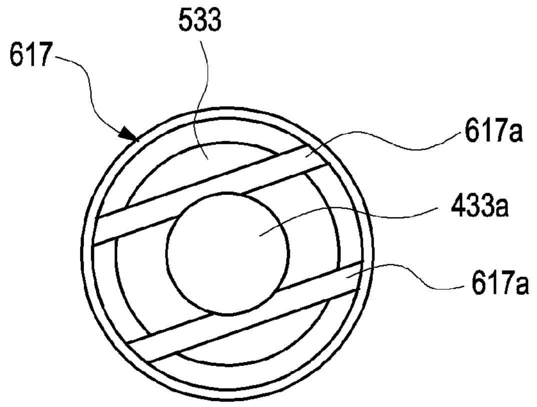
FIG. 15 is a first side surface view illustrating a configuration in which a coupling pin of an electronic device according to an embodiment of the disclosure.
Figure 16:
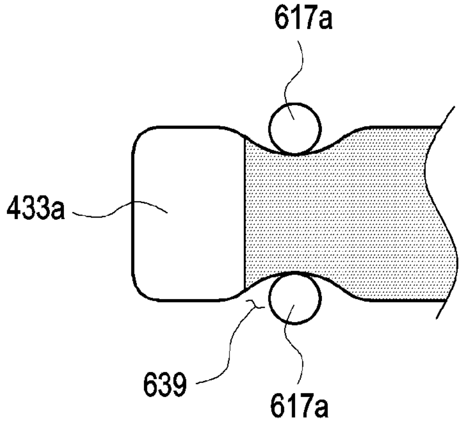
FIG. 16 is a second side surface view illustrating a configuration in which a coupling pin of an electronic device according to an embodiment of the disclosure.

FIG. 13 is a perspective view illustrating a coupling pin of an electronic device according to an embodiment of the disclosure. FIG. 14 is a view illustrating a configuration in which a coupling pin a of an electronic device according to an embodiment of the disclosure. FIG. 15 is a first side surface view illustrating a configuration in which a coupling pin of an electronic device according to an embodiment of the disclosure. FIG. 16 is a second side surface view illustrating a configuration in which a coupling pin of an electronic device according to an embodiment of the disclosure.

Referring to FIGS. 13 to 16, the coupling pin 603 may further include the conductive coating layer 633 made of an electrical conductivity material, so as to provide an additional electric wire. For example, when the sleeve 533 and the core portion (e.g., the first core portion 433*a*) provide two signal lines, the conductive coating layer 633 may provide one additional signal line. Similarly to an embodiment to be described by referring to FIGS. 17 and 18, the conductive coating layer 633 may be electrically insulated from the first core portion 433*a*, the tube portion 431 and/or the sleeve 533, and the detailed description related thereto will be described later. In an embodiment of the disclosure, the conductive coating layer 633 may be configured on at least a part of the surface of the first core portion 433*a* and/or the tube portion 431, and the sleeve 533 may be disposed to surround a part of the conductive coating layer 633. In an embodiment of the disclosure, one part of the conductive coating layer 633, for example, a first end 633*a*, may be exposed to the external space on the first core portion 433*a*, and the other part of the conductive coating layer 633, for example, a second end 633*b*, may be exposed to the external space on the tube portion 431. For example, the sleeve 533 may be disposed to partially surround the conductive coating layer 633, and opposite ends of the conductive coating layer 633 may not be surrounded by the sleeve 533. The first end 633*a* of the conductive coating layer 633 is positioned at the connection part (DH) to be substantially disposed in the inner part (e.g., the inner part of the coupling hole 413 of FIG. 11) of the housing (e.g., the housing 401 of FIG. 11 or 12), and the second end 633*b* is positioned at the receiving part (DS) to be disposed in the inner part of the wearing member 402. The conductive coating layer 633 may be electrically connected to the electrical component(s) disposed at the wearing member 402 and in the wearing member 402, and may be electrically connected to the circuit devices in the housing 401.

According to various embodiments of the disclosure, the electronic device 400 may further include a connection member 617 which electrically comes into contact with the conductive coating layer 633 in the housing 401. The connection member 617 may be electrically connected to the circuit device accommodated in the housing 401 and disposed in a shape of surrounding the circumference of the coupling hole 413. In an embodiment of the disclosure, the connection member 617 may include at least one connection pin 617*a* disposed thereinside. When the connection member 617 has a ring shape to surround the circumference of the coupling hole 413, the connection pin 617*a* may be disposed to traverse the ring. The connection pin 617*a* may be disposed to come into contact with the surface of the first core portion 433*a* in the coupling hole 413, for example, the first end 633*a* of the conductive coating layer 633. In an embodiment of the disclosure, one pair of the connection pins 617*a* may be disposed, and the first core portion 433*a* and/or the conductive coating layer 633 may be disposed between the one pair of the connection pins 617*a*.

According to various embodiments of the disclosure, the connection pin 617*a* may be used as a structure in which the coupling pin 403 is restricted in the housing 401 (e.g., the coupling hole 413 of FIG. 11). In an embodiment of the disclosure, the first core portion 433*a* may include a dummy groove 639 configured along a circumferential direction, and the connection pin 617*a* may be engaged with the dummy groove 639 when the coupling pin 403 (e.g., the first core portion 433*a*) is coupled to the coupling hole 413. For example, the connection pin 617*a* may configure an electric wire together with the conductive coating layer 633, and may be used as a structure for stably binding or holding the connection pin 403 to the housing 401.

Figure 17:
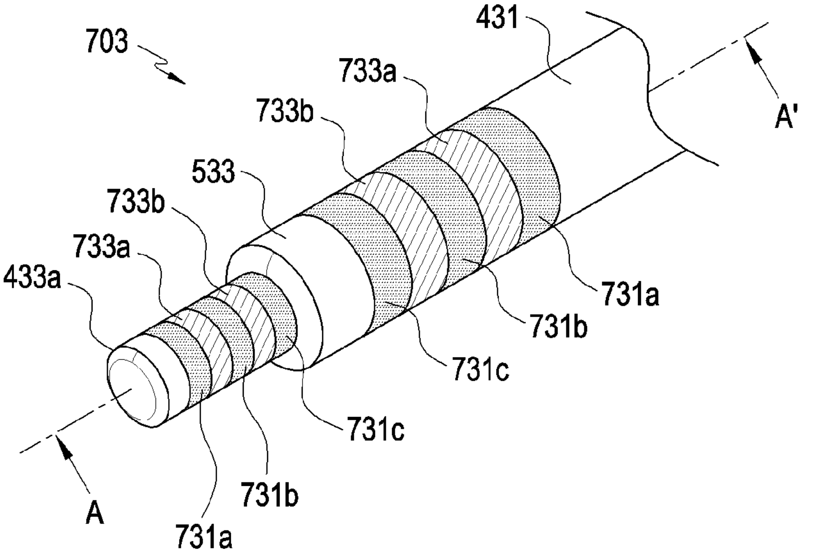
FIG. 17 is a perspective view illustrating a coupling pin of an electronic device according to an embodiment of the disclosure.
Figure 18:
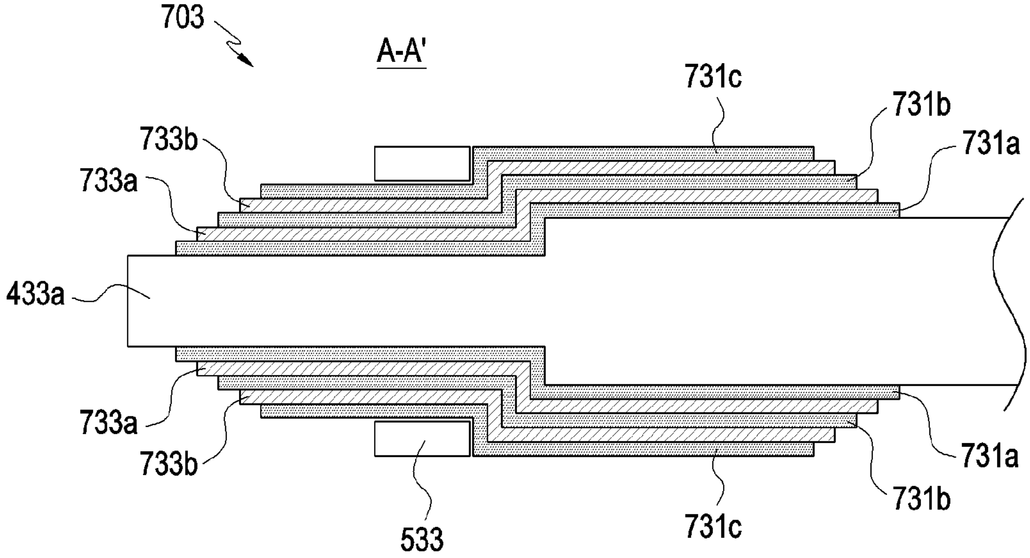
FIG. 18 is a cross-sectional view illustrating a configuration of a coupling pin of an electronic device according to an embodiment of the disclosure.

FIG. 17 is a perspective view illustrating a coupling pin of an electronic device according to an embodiment of the disclosure. FIG. 18 is a cross-sectional view illustrating a configuration of a coupling pin of an electronic device according to an embodiment of the disclosure. For example, FIG. 18 may be a cross-sectional view illustrating the configuration of the coupling pin 703 taken long line A-A of FIG. 17.

Referring to FIG. 18, it notes that conductive coating layer(s) 733*a*, 733*b* and/or insulation coating layer(s) 731*a*, 731*b*, 731*c* are illustrated to have an exaggerated size for convenience of explanation. For example, on the surface of the coupling pin 703 which is actually to be manufactured, the conductive coating layer(s) 733*a*, 733*b* and/or the insulation coating layer(s) 731*a*, 731*b*, 731*c* may be configured to have a significantly thin thickness which cannot be substantially recognized by a naked eye or tactile sensation of a user.

Referring to FIGS. 17 and 18, the coupling pin 703 may include a plurality of conductive coating layers 733*a*, 733*b*. For example, in the embodiments of FIGS. 9 to 16, the coupling pins 403, 603 providing two or three signal lines may be illustrated, but the coupling pin 703 according to the embodiment may provide four or more signal lines. Similarly to the embodiments of FIGS. 13 to 16, the conductive coating layer(s) 733*a*, 733*b* of the embodiment may be disposed in the housing (e.g., the housing 401 of FIG. 11) and/or in the wearing member (e.g., the wearing member 402 of FIG. 12) while being partially exposed to the external space of the coupling pin 703.

According to various embodiments of the disclosure, the coupling pin 703 may include a plurality of insulation coating layers 731*a*, 731*b* for insulating the first core portion 433*a*, the tube portion 431, the sleeve 533 and/or the conductive coating layers 733*a*, 733*b*. In an embodiment of the disclosure, the first insulation coating layer 731*a* among the insulation coating layers 731*a*, 731*b* may be configured on at least a part of the surfaces of the first core portion 433*a* and the tube portion 431 and the first conductive coating layer 733*a* (e.g., the conductive coating layer 633 of FIG. 13) among the conductive coating layers 733*a*, 733*b* may be configured on the surface of the first insulation coating layer 731*a*. The first insulation coating layer 731*a* is partially exposed to the external space even if the first conductive coating layer 733*a* is configured, so that an electrical insulation structure between the first core portion 433*a* (and/or the tube portion 431) and the first conductive coating layer 733*a* may be configured. For example, the first insulation coating layer 731*a* may be configured to have a size larger than that of a region or an area configuring the first conductive coating layer 733*a*. The second insulation coating layer(s) 731*b* among the insulation coating layers 731*a*, 731*b* may be configured on the surface of the first conductive coating layer 733*a*, and the first conductive coating layer 733*a* may be configured to be larger than the area in which the second insulation coating layer 731*b* is configured to be partially exposed to the external space. Likewise, the configuration of the coupling pin 703 including the first insulation coating layer 731*a*, the first conductive coating layer 733*a* and/or the second insulation coating layer 731*b* may be used for configuring the conductive coating layer 633 of the coupling pin 603 described through FIGS. 13 to 16. According to an embodiment of the disclosure, the first insulation coating layer 731*a* may insulate the first conductive coating layer 733*a* and the sleeve 533 from the first core portion 433*a* or the tube portion 431, and the second insulation coating layer 731*b* may insulate the sleeve 533 from the first conductive coating layer 733*a*. For example, the first insulation coating layer 731*a* and/or the second insulation coating layer 731*b* may provide an electrical insulation structure among the first core portion 433*a*, the tube portion 431, the conductive coating layer(s) 731*a* or 731*b* and/or the sleeve 533.

According to various embodiments of the disclosure, the coupling pin 703 may further include the second conductive coating layer 733*b* and the third insulation coating layer 731*c*. For convenience of explanation, the first conductive coating layer 733*a* and the second conductive coating layer 733*b* are distinguished, and the second insulation coating layer 731*b* and the third insulation coating layer 731*c* are distinguished and described. In an embodiment of the disclosure, it may be interpreted that a plurality of conductive coating layers 733*a*, 733*b* and a plurality of the second insulation coating layers 731*b* may be alternately configured on the first insulation coating layer 731*a*. The second conductive coating layer 733*b* is configured on the surface of the second insulation coating layer 731*b* to enable a part of the second insulation coating layer 731*b* to be exposed to the external space, and the third insulation coating layer 731*c* is configured on the surface of the second conductive coating layer 733*b* to enable a part of the second conductive coating layer 733*b* to be exposed to the external space. The sleeve 533 may be disposed to substantially surround the third insulation coating layer 731*c*, and may be electrically insulated from the second conductive coating layer 733*b*. In an embodiment of the disclosure, a part exposed to the external space of the coupling pin 703 among the insulation coating layers 731*a*, 731*b*, 731*c* or the conductive coating layers 733*a*, 733*b* may be substantially and electrically connected to the circuit device and/or the electrical component(s) in the housing (e.g., the housing 401 of FIG. 11) and/or in the wearing member (e.g., the wearing member 402 of FIG. 12). For example, the coupling pin 703 may provide a first signal line including the first core portion 433*a*, a second signal line including the sleeve 533, a third signal line including the first conductive coating layer 733*a*, and/or a fourth signal line including the second conductive coating layer 733*b*.

In the illustrated embodiments of the disclosure, the configuration in which the coupling pin 703 includes two conductive coating layers 733*a*, 733*b* and three insulation coating layers 731*a*, 731*b*, 731*c* is illustrated, but various embodiments described in the document is not limited thereto. For example, the coupling pin 703 may provide five or more signal lines by including an additional conductive coating layer and an additional insulation coating layer (not illustrated). The number of the conductive coating layer or the insulation coating layer may be appropriately selected based on elements, such as a mechanical property change according to the number of the signal line required from the electronic device (e.g., the electronic device 400 of FIGS. 5 and 6), a standard of the coupling pin (e.g., the coupling pins 403, 403*a*, 403*b*, 603, 703 of FIGS. 7 to 10 and/or FIGS. 13 to 18) permitted for the wearing member (e.g., the wearing member 402 of FIGS. 5 and 6) or the housing (e.g., the housing 401 of FIGS. 5 and 6) and/or the number of the coating layer.

Figure 19:
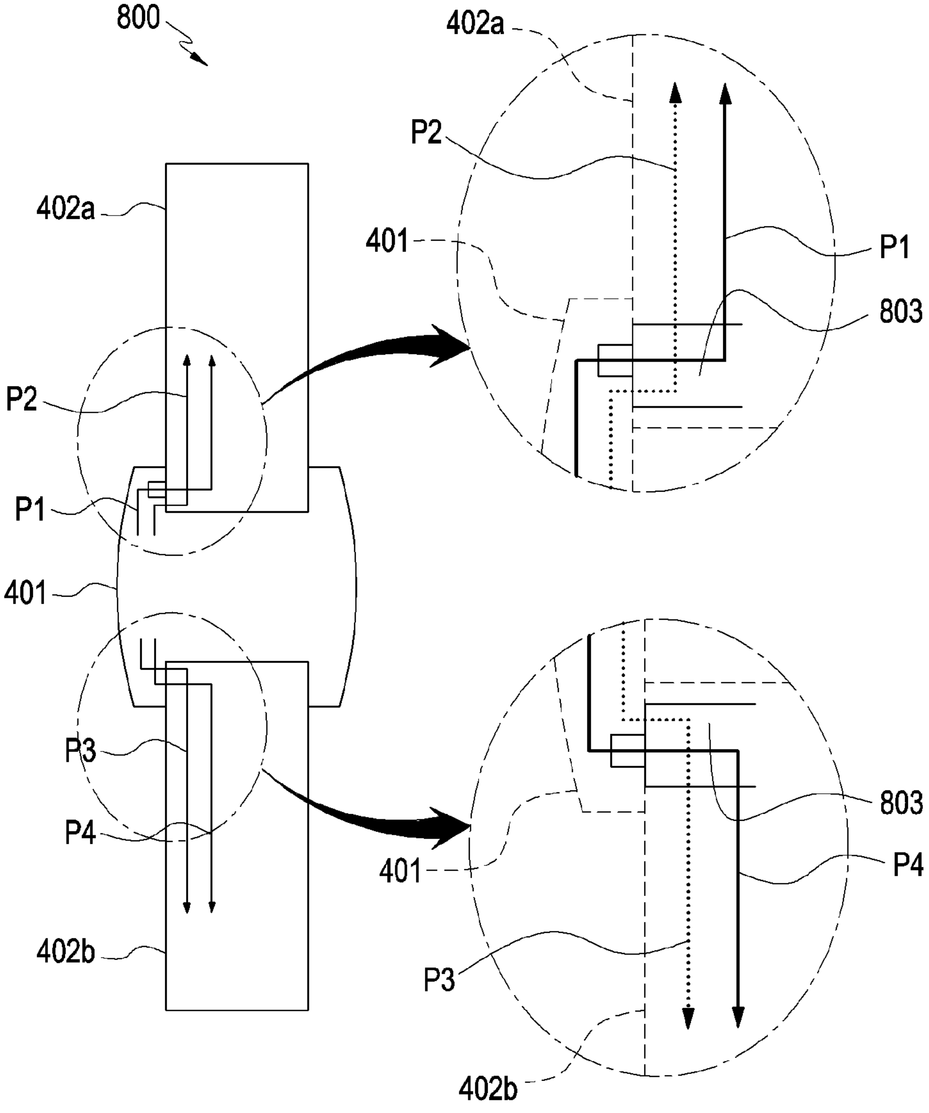
FIG. 19 is a view illustrating a configuration of a wire using a coupling pin in an electronic device according to an embodiment of the disclosure.

FIG. 19 is a view illustrating a configuration of a wire using a coupling pin in an electronic device according to an embodiment of the disclosure.

Referring to FIG. 19, the electronic device 800 may include the housing 401 and a pair of the wearing members 402*a*, 402*b*, and the first wearing member 402*a* among the wearing members 402*a*, 402*b* may be detachably coupled to the first position of the housing 401, the second wearing member 402*b* may be detachably coupled to the housing 401 at the second position different from the first position. When the wearing members 402*a*, 402*b* are coupled to the housing 401, one of the coupling pins (e.g., the coupling pins 403, 403*a*, 403*b*, 603, 703 of FIGS. 7 to 10 and/or FIGS. 13 to 18) may be used. Coupling pin(s) 803 may provide a first signal line P1 and a second signal line P2, for example, two signal lines, between the first wearing member 402*a* and the housing 401, and may provide two signal lines P3, P4 between the second wearing member 402*b* and the housing 401. It is obvious that the number of the signal line provided by the coupling pin 803 may vary according to the embodiment as described above, and is not limited to the embodiment illustrated in FIG. 19.

Figure 20:
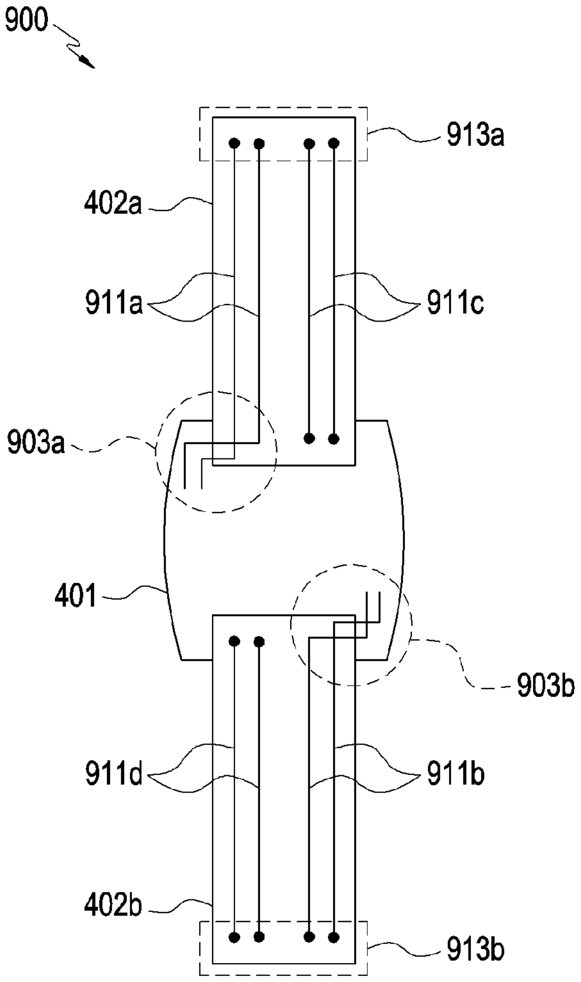
FIG. 20 is a view illustrating a configuration of a wire using a coupling pin in an electronic device according to an embodiment of the disclosure.

FIG. 20 is a view illustrating a configuration of a wire using a coupling pin in an electronic device according to an embodiment of the disclosure.

Referring to FIG. 20, an electronic device 900 may include contact terminals 913*a*, 913*b* provided in the wearing members 402*a*, 402*b*, when including the plurality (e.g., one pair) of wearing members 402*a*, 402*b*. In a state where a user wears the electronic device 900 on a part of the body, the electrical components disposed in each of the wearing members 402*a*, 402*b* may be electrically connected through the contact terminals 913*a*, 913*b*. The contact terminals 913*a*, 913*b* may include, for example, an elastic body, such as a pogo pin or a C-clip having electrical conductivity. The wearing members 402*a*, 402*b* may be detachably coupled to the housing 401 at different positions through different coupling pins 403. For example, the coupling pins 403 are accommodated in a first end of the wearing members 402*a*, 402*b* to enable the wearing members 402*a*, 402*b* to be coupled to the housing 401, and the contact terminals 913*a*, 913*b* may be provided at a second end of the wearing members 402*a*, 402*b*. When the electrical component is disposed in the wearing member(s) 402*a*, 402*b*, the coupling pin 403 may be configured to transmit an electric signal and power between the electrical component and the circuit device accommodated in the housing 401. For example, similarly to the embodiment described through FIG. 19, the coupling pin 403 may provide an electrical connection structure (e.g., signal lines P1, P2, P3, P4 of FIG. 19) between the wearing member(s) 402*a*, 402*b* and the housing 401, at connection parts 903*a*, 903*b*.

According to various embodiments of the disclosure, in a state where a user wears the electronic device 900 on a part of the body, the first contact terminals 913*a* of the first wearing member 402*a* among the wearing members 402*a*, 402*b* may be disposed to be in contact with one of the second contact terminals 913*b* of the second wearing member 402*b*. For example, the contact terminals 913*a*, 913*b* provided in the wearing member 402*a*, 402*b* may configure an electric wire between the wearing members 402*a*, 402*b*. In an embodiment of the disclosure of the disclosure, even if the electronic device 900 is not worn on a part of the body, the first contact terminals 913*a* and the second contact terminals 913*b* may be electrically connected. For example, regardless of whether the electronic device 900 is worn on a part of the body, the first contact terminals 913*a* and the second contact terminals 913*b* may be electrically connected according to a coupling state of the first wearing member 402*a* and the second wearing member 402*b*.

According to various embodiments of the disclosure, the electronic device 900 may include a plurality of wires provided in the wearing members 402*a*, 402*b*. For example, at least one first wire 911*a* electrically connected to the circuit device accommodated in the housing 401 through the coupling pin 403 is disposed in the first wearing member 402*a*, and at least one second wire 911*b* electrically connected to the circuit device accommodated in the housing 401 through the other coupling pin 403 may be provided in the second wearing member 402*b*. In an embodiment of the disclosure, at least one third wire 911*c* which is electrically connected to one of the first contact terminals 913*a* and is not connected to the coupling pin 403 is provided in the first wearing member 402*a*, and at least one fourth wire 911*d* which is electrically connected to one of the second contact terminals 913*b* and is not connected to the coupling pin 403 may be provided in the second wearing member 402*b*. For example, more wires (e.g., additional third wires 911*c* and fourth wires 911*d*) than the wires (e.g., the first wires 911*a* and the second wires 911*b*) provided through the coupling pin(s) 403 may be disposed in the wearing members 402*a*, 402*b*.

According to various embodiments of the disclosure, the third wires 911*c* may be electrically connected to the second wires 911*b* through the first contact terminal 913*a* and the second contact terminal 913*b*. For example, the third wires 911*c* may sequentially pass via the first contact terminal 913*a*, the second contact terminal 913*b*, the second wires 911*b* and/or the coupling pin 403 disposed in the second wearing member 402*b* to be electrically connected to the circuit device accommodated in the housing 401. In an embodiment of the disclosure, the fourth wires 911*d* may be electrically connected to the first wires 911*a* through the second contact terminal 913*b* and the first contact terminal 913*a*. For example, the fourth wires 911*d* may sequentially pass via the second contact terminal 913*b*, the first contact terminal 913*a*, the first wires 911*a* and/or the coupling pin 403 disposed in the first wearing member 402*a* to be electrically connected to the circuit device accommodated in the housing 401.

According to various embodiments of the disclosure, the first wires 911*a* may include a power wire and a ground wire, and the second wires 911*b* may include a wire for signal transmission and a wire for signal reception. Herein, distinguishing the power wire, the ground wire, the wire for signal transmission and/or the wire for reception is for convenience of explanation, so that one skilled in the art may easily understand that bidirectional signal transmission is possible through one signal line. The electric object disposed on the wearing member(s) 402*a*, 402*b* may be electrically connected to the circuit device accommodated in the housing 401 by using at least one of the first wires 911*a*, the second wires 911*b*, the third wires 911*c* and/or the fourth wires 911*d*. In this regard, even if the number of the wire and/or signal line capable of being provided by the coupling pin 403 is limited, the number of the wire and/or signal line disposed in the wearing members 402*a*, 402*b* may be larger than the number of the wire and/or signal line provided by one coupling pin 403 when the electronic device 900 includes the plurality of wearing members 402*a*, 402*b*.

According to various embodiments of the disclosure, a plurality of signal lines (e.g., four or more) are provided at different segments, for example, between the housing 401 and the wearing members 402*a*, 402*b*, so that the design freedom degrees may be improved when the electrical component disposed in the wearing members 402*a*, 402*b*, for example, an optical sensor, an electric sensor, and/or a chemical sensor for detecting biometric information is selected or disposed. In an embodiment of the disclosure, even though the coupling pin 403 may allow a relative position movement of the housing 401 and the wearing members 402*a*, 402*b*, the durability or the reliability of the electric wire may be improved, and wearing of the electronic device 900 may be comfortable since the weight according to the relative position movement of the housing 401 and the wearing members 402*a*, 402*b* is not substantially applied to the electric wire.

Figure 21:
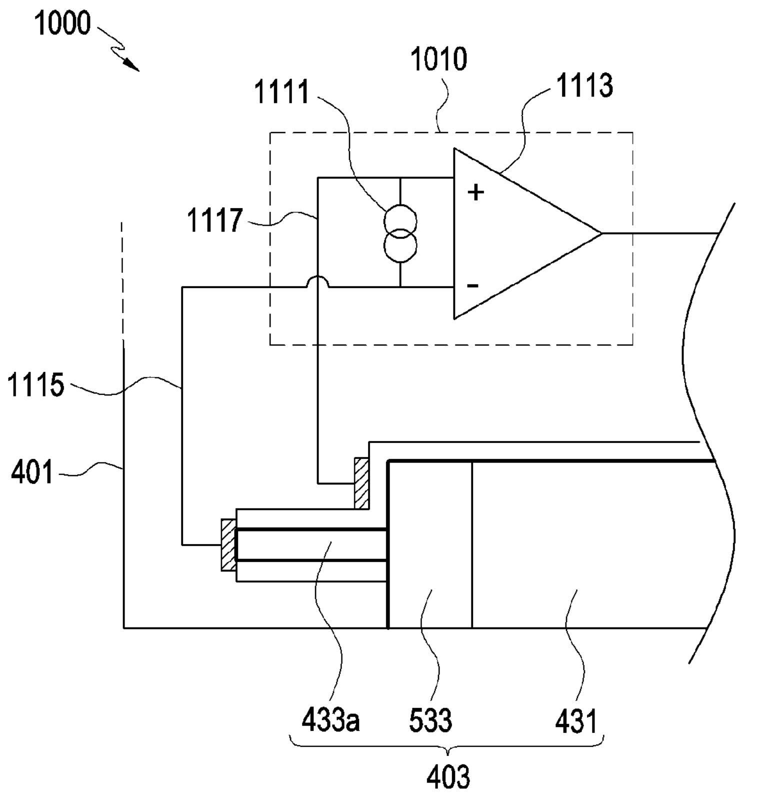
FIG. 21 is a view illustrating a configuration of a detection part of an electronic device according to an embodiment of the disclosure.

FIG. 21 is a view illustrating a configuration of a detection part of an electronic device according to an embodiment of the disclosure.

Referring to FIG. 21, the electronic device 1000 may further include the detection part 1010, for example, a resistance measurement module. The coupling pin 403 may not be exposed to the external environment and may be protected through a tight-contact structure between the housing 401 and the wearing member (e.g., the wearing member 402 of FIG. 12). The relative position change or movement may occur between the housing 401 and the wearing member 402, and in this process, the moisture or foreign materials may contaminate the coupling pin 403. In an embodiment of the disclosure, contaminant may cause an electrical short-circuit among the core portion (e.g., the first core portion 433*a*), the sleeve 533 and/or the conductive coating layer (e.g., the conductive coating layers 633, 733*a*, 733*b* of FIGS. 13 to 18). The detection part 1010 may detect a change of an electric resistance among the first core portion 433*a*, the sleeve 533 and/or the conductive coating layers, and the electronic device 1000, for example, the process02 120 of FIG. 1, may block an electric signal or power transmitted through the coupling pin 403, based on a detection result of the detection part 1010.

According to various embodiments of the disclosure, the detection part 1010 using the resistance measurement module may include an alternating current power source 1111 and a voltage measuring device 1113, a first terminal 1115 is electrically connected to a core portion (e.g., the first core portion 433*a* and/or the tube portion 431) of the coupling pin 403, and a second terminal 1117 may be electrically connected to the sleeve 533. For example, the resistance measurement module (e.g., the detection part 1010) may detect an electric resistance between the first core portion 433*a* and the sleeve 533, and the electronic device 1000 may block an electric signal or power transmitted through the coupling pin 403 when the detected electric resistance is out of the range of a predetermined value, for example, lower than the predetermined value. In an embodiment of the disclosure, in order to prevent an electrical short-circuit by contaminant, the electronic device 1000 may configure the sheath or coating layer on the surface of the coupling pin 403 (e.g., the first core portion 433*a* or the sleeve 533) by using a hydrophobic material, for example, Teflon or oil. For example, even though contaminant enters between the housing 401 and the wearing member(s) 402, it may be prevented that the coupling pin 403 is contaminated or the electrical short-circuit occurs, through an insulation coating.

According to various embodiments of the disclosure, as an electric object disposed in the wearing member 402, an electronic device (e.g., the external electronic devices 101, 102, 104, 200, 300, 400, 800, 900, 1000 of FIGS. 1 to 6 and/or FIGS. 19 to 21) may include sensors (e.g., the optical sensor 423*a*, the electric sensor 423*b*, and/or the chemical sensor 423*c* of FIG. 4) for detecting biometric information. For example, enough signal wires may be provided between the electrical component and the circuit device of the housing 401, so that the design freedom degrees for types, the number, and disposition locations of the sensors may be improved. In an embodiment of the disclosure, one sensor may include a plurality of electrode pads or probes for the sensor, and the optimum number of the electrode pads or the probes for the sensor may be positioned at the optimum position based on measurement accuracy. In an embodiment of the disclosure, the sensor may detect biometric information by using the selected one part among the plurality of electrode pads or the probes for the sensor, and the electrode pad or the probe for the sensor to be used for measurement may be selected by an algorism of the circuit device(s) accommodated in the housing.

As described above, according to various embodiments described in the document, a coupling pin (e.g., the coupling pins 403, 403*a*, 403*b*, 603, 703 of FIGS. 7 to 10 and/or FIGS. 13 to 18) may be configured to connect a wearing member (e.g., the wearing members 402, 402*a*, 402*b* of FIGS. 5, 6, 12, 19 and/or 20) to a housing (e.g., the side surface bezel structures 310, 401 or the housing of FIGS. 2 to 6 and/or 11) of a wearable electronic device (e.g., the external electronic devices 101, 102, 104, 200, 300, 400, 800, 900, 1000 of FIGS. 1 to 6 and/or FIGS. 19 to 21), and the coupling pin and/or the wearable electronic device including the same may include a tube portion (e.g., the tube portion 431 of FIGS. 7 to 10) configured to be accommodated in the wearing member and at least partially having electrical conductivity, a core portion (e.g., the first core portion 433*a* and/or the second core portion 433*b* of FIGS. 7 to 10) configured to protrude from at least one of opposite ends of the tube portion to be bound to the housing and at least partially having electrical conductivity, and a sleeve (e.g., the sleeve 533 of FIGS. 9 and/or 10) disposed adjacent to the tube portion in a state of surrounding at least a portion of the core portion and having electrical conductivity, wherein the sleeve may be electrically insulated from the core portion and the tube portion, and at least one of the core portion and the sleeve may be configured to transmit an electric signal or power between the wearing member and the housing.

According to various embodiments of the disclosure, the coupling pin and/or the wearable electronic device including the same may further include an insulation coating layer (e.g., the insulation coating layers 531, 731*a*, 731*b* of FIGS. 5, 17 and/or 18) configured on at least a part of surfaces of the tube portion and the core portion, wherein the insulation coating layer may be configured to insulate the sleeve from the core portion and the tube portion.

According to various embodiments of the disclosure, the sleeve may include a member having a tube shape or a ring shape and coupled to surround the core portion.

According to various embodiments of the disclosure, the coupling pin and/or an electronic device including the same may further include a first insulation coating layer (e.g., the insulation coating layers 531, 731*a* of FIGS. 5, 17 and/or 18) configured on at least a part of surfaces of the tube portion and the core portion, a conductive coating layer (e.g., the conductive coating layers 633, 733*a* of FIGS. 13, 17 and/or 18) configured on at least a part of a surface of the first insulating coating layer, and a second insulation coating layers (e.g., the second and third insulation coating layers 731*b*, 731*c* of FIGS. 17 and/or 18) configured on at least a part of a surface of the first insulation coating layer, wherein the first insulation coating layer may be configured to insulate the sleeve and the conductive coating layer from the core portion and the tube portion and the second insulation coating layer may be configured to insulate the sleeve from the conductive coating layer.

According to various embodiments of the disclosure, the conductive coating layer may be configured to transmit an electric signal or power between the wearing member and the housing, along with at least one of the core portion and the sleeve.

According to various embodiments of the disclosure, a first end of the first insulation coating layer, a first end of the conductive coating layer (e.g., the first end 633*a* of FIG. 13), and a first end of the second conductive coating layer may be configured to be exposed to an external space on the core portion.

According to various embodiments of the disclosure, a second end of the first insulation coating layer, a second end of the conductive coating layer (e.g., the second end 633*b* of FIG. 13), and a second end of the second conductive coating layer may be configured to be exposed to an external space on the tube portion.

According to various embodiments of the disclosure, the coupling pin and/or an electronic device including the same may further include a first insulation coating layer formed on at least a part of surfaces of the tube portion and the core portion, a plurality of conductive coating layers formed on the first insulating coating layers, and a plurality of second insulation coating layers alternatively configured with the conductive coating layers on the first insulation coating layers, wherein the first insulation coating layer and the second insulation coating layers are configured to insulate the sleeve from the core portion, the tube portion, and the conductive coating layers.

According to various embodiments of the disclosure, at least one of the core portion and the sleeve may be configured to electrically connect an electrical component (e.g., the sensor part or the sensors 423, 423*a*, 423*b*, 423*c* of FIGS. 5 and 6) disposed in the wearing member and the circuit device (e.g., the processor 120, the memory 130, the communication module 190 and/or the battery 189 of FIG. 1) disposed in the housing or the printed circuit board 380 of FIG. 4.

According to various embodiments described in the document, a wearable electronic device (e.g., the external electronic devices 101, 102, 104, 200, 300, 400, 800, 900, 1000 of FIGS. 1 to 6 and/or FIGS. 19 to 21) may include a housing (e.g., the housing or the side surface bezel structures 310, 401 of FIGS. 2 to 6 and/or 11), a circuit device (e.g., the processor 120, the memory 130, the communication module 190, and/or the battery 189 of FIG. 1) accommodated in the housing or the printed circuit board 380 of FIG. 4, at least one wearing member (e.g., the wearing members 402, 402*a*, 402*b* of FIGS. 5 and 6, FIGS. 12, 19 and/or 20) detachably coupled to at least a part of the housing and configured to enable the housing to be worn on a part of a user's body, at least one electrical component (e.g., the sensor part or the sensors 423, 423*a*, 423*b*, 423*c* of FIGS. 5 and 6) disposed in the wearing member, and a coupling pin (e.g., the coupling pins 403, 403*a*, 403*b*, 603, 703 of FIGS. 7 to 10 and/or FIGS. 13 to 18) which is accommodated in the wearing member, and a part of which is bound to the housing to enable the wearing member to be detachably coupled to the housing, wherein the coupling pin may be configured to transmit an electric signal and power between the circuit device and the electrical component.

According to various embodiments of the disclosure, the wearing member may be configured to rotate around the coupling pin and relative to the housing.

According to various embodiments of the disclosure, the coupling pin may include a tube portion (e.g., the tube portion 431 of FIGS. 7 to 10) configured to be accommodated in the wearing member and at least partially having electrical conductivity, a core portion (e.g., the first core portion 433*a* and/or the second core portion 433*b* of FIGS. 7 to 10) configured to protrude from at least one of opposite ends of the tube portion to be bound to the housing and at least partially having electrical conductivity, and a sleeve (e.g., the sleeve 533 of FIGS. 9 and/or 10) disposed adjacent to the tube portion in a state of surrounding at least a portion of the core portion and having electrical conductivity, wherein the sleeve may be electrically insulated from the core portion and the tube portion, and at least one of the core portion and the sleeve may be configured to transmit an electric signal or power.

According to various embodiments of the disclosure, the coupling pin may further include an insulation coating layer (e.g., the insulation coating layers 531, 731*a*, 731*b* of FIGS. 5, 17 and/or 18) configured on at least a part of surfaces of the tube portion and the core portion, and the insulation coating layer may be configured to insulate the sleeve from the core portion and the tube portion.

According to various embodiments of the disclosure, the coupling pin may further include a first insulation coating layer (e.g., the insulation coating layers 531, 731*a* of FIGS. 5, 17 and/or 18) configured on at least a part of surfaces of the tube portion and the core portion, a conductive coating layer (e.g., the conductive coating layers 633, 733*a* of FIGS. 13, 17 and/or 18) configured on at least a part of a surface of the first insulating coating layer, and a second insulation coating layer (e.g., the second and third insulation coating layers 731*b*, 731*c* of FIGS. 17 and/or 18) configured on at least a part of a surface of the first conductive coating layer, wherein the first insulation coating layer is configured to insulate the sleeve and the conductive coating layer from the core portion and the tube portion, and the second insulation coating layer may be configured to insulate the sleeve from the conductive coating layer.

According to various embodiments of the disclosure, the conductive coating layer may be configured to transmit an electric signal or power, along with at least one of the core portion and the sleeve.

According to various embodiments of the disclosure, the wearable electronic device may further include a detection part (e.g., the detection part 1010 of FIG. 21) configured to detect an electrical resistance value between the core portion and the sleeve, wherein the circuit device (e.g., the processor 120 of FIG. 1) may be configured to selectively block an electric signal or power transmitted through at least one of the core portion and the sleeve, based on the electrical resistance value detected by the detection part.

According to various embodiments of the disclosure, the wearing member may include a first wearing member (e.g., the first wearing member 402*a* of FIGS. 19 and 20) detachably coupled to the housing at a predetermined first position and a second wearing member (e.g., the second wearing member 402*b* of FIGS. 19 and 20) detachably coupled to the housing at a second position different from the first position, and the coupling pin may include a first coupling pin configured to enable the first wearing member to be detachably coupled to the housing at a first end of the first wearing member and a second coupling pin configured to enable the second wearing member to be detachably coupled to the housing at a second end of the second wearing member, wherein the first coupling pin may be configured to transmit an electric signal or power between the circuit device and the electrical component disposed in the first wearing member, or the second coupling pin may be configured to transmit an electric signal or power between the circuit device and the electrical component disposed in the second wearing member.

According to various embodiments of the disclosure, the wearable electronic device may further include a plurality of first contact terminals (e.g., the first contact terminal 913*a* of FIG. 20) provided in the first wearing member at a position different from a first end of the first wearing member, and a plurality of second contact terminals (e.g., the second contact terminal 913*b* of FIG. 20) provided in the second wearing member at a position different from a first end of the second wearing member, wherein the first contact terminals and the second contact terminals are configured to transmit an electric signal or power between the first wearing member and the second wearing member.

According to various embodiments of the disclosure, the wearable electronic device may further include at least one first wire (e.g., the first wires 911*a* of FIG. 20) provided in the first wearing member and configured to be electrically connected to the circuit device through the first coupling pin, at least one second wire (e.g., the second wires 911*b* of FIG. 20) provided in the second wearing member and configured to be electrically connected to the circuit device through the second coupling pin, at least one third wire (e.g., the third wires 911*c* of FIG. 20) provided in the first wearing member and configured to sequentially pass via one of the first contact terminals, one of the second contact terminals, the second wire, and the second coupling pin to be electrically connected to the circuit device, and at least one fourth wire (e.g., the fourth wires 911*d* of FIG. 20) provided in the second wearing member and configured to sequentially pass via another one of the second contact terminals, another one of the first contact terminals, the first wire, and the first coupling pin to be electrically connected to the circuit device.

According to various embodiments of the disclosure, the electrical component may be electrically connected to the circuit device through at least one of the first wire, the second wire, the third wire, and the fourth wire.

Although specific embodiments have been described above in the detailed description of the disclosure, it will be obvious to those of ordinary skill in the art that various modifications are possible without departing from the scope of the disclosure. For example, as referring to FIG. 17, in a structure in which the plurality of conductive coating layers 733*a*, 733*b* and insulation coating layers 731*a*, 731*b*, 731*c* are alternately provided, one of the conductive coating layers 733*a*, 733*b* may be disposed on the dummy groove 639 and electrically come into contact with the connection pin 617*a*, similar to the embodiments of FIGS. 13 to 19. For example, configurations of various embodiments described in the document are selectively combined, to implement the other various embodiments.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A coupling pin configured to connect a wearing member to a housing of a wearable electronic device, the coupling pin comprising:

a tube portion accommodated in the wearing member and at least partially having electrical conductivity;

a core portion configured to protrude from at least one of opposite ends of the tube portion to be bound to the housing and at least partially having electrical conductivity; and a sleeve disposed adjacent to the tube portion in a state of surrounding at least a portion of the core portion and having electrical conductivity, wherein the sleeve is electrically insulated from the core portion and the tube portion, wherein the core portion and the sleeve are configured to be electrically connected to the housing of the wearable electronic device to transmit an electric signal or power between the wearing member and the housing, wherein a combination of the tube portion and the core portion is configured to be a first electric wire between the housing of the wearable electronic device and the wearing member, and wherein the sleeve is configured to be a second electric wire between the housing of the wearable electronic device and the wearing member.

2. The coupling pin of claim 1, further comprising:

an insulation coating layer formed on at least a part of surfaces of the tube portion and the core portion, wherein the insulation coating layer is configured to insulate the sleeve from the core portion and the tube portion.

3. The coupling pin of claim 1, wherein the sleeve comprises a member having a tube shape or a ring shape and coupled to surround the core portion.

4. The coupling pin of claim 1, further comprising:

a first insulation coating layer formed on at least a part of surfaces of the tube portion and the core portion;

a conductive coating layer formed on at least a part of a surface of the first insulating coating layer; and a second insulation coating layer formed on at least a part of a surface of the conductive coating layer, wherein the first insulation coating layer is configured to insulate the sleeve and the conductive coating layer from the core portion and the tube portion, and wherein the second insulation coating layer is configured to insulate the sleeve from the conductive coating layer.

5. The coupling pin of claim 4, wherein the conductive coating layer is configured to transmit an electric signal or power between the wearing member and the housing, along with at least one of the core portion and the sleeve.

6. The coupling pin of claim 4, wherein a first end of the first insulation coating layer, a first end of the conductive coating layer, and a first end of the second insulation coating layer are configured to be exposed to an external space on the core portion.

7. The coupling pin of claim 4, wherein a second end of the first insulation coating layer, a second end of the conductive coating layer, and a second end of the second insulation coating layer are configured to be exposed to an external space on the tube portion.

8. The coupling pin of claim 1, further comprising:

a first insulation coating layer formed on at least a part of surfaces of the tube portion and the core portion;

a plurality of conductive coating layers formed on the first insulating coating layer; and a plurality of second insulation coating layers alternatively configured with the plurality of conductive coating layers on the first insulation coating layer, wherein the first insulation coating layer and the second insulation coating layers are configured to insulate the sleeve from the core portion, the tube portion, and the plurality of conductive coating layers.

9. The coupling pin of claim 1, wherein at least one of the core portion and the sleeve may be configured to electrically connect an electrical component disposed in the wearing member and a circuit device disposed in the housing.

10. A wearable electronic device comprising:

a housing;

a circuit device accommodated in the housing;

at least one wearing member detachably coupled to at least a part of the housing and configured to enable the housing to be worn on a part of a user's body;

at least one electrical component disposed in the at least one wearing member; and a coupling pin accommodated in the at least one wearing member, wherein a part of the coupling pin is bound to the housing to enable the at least one wearing member to be detachably coupled to the housing, wherein the coupling pin is configured to transmit an electric signal and power between the circuit device and the electrical component, wherein the coupling pin comprises:

a tube portion accommodated in the at least one wearing member and at least partially having electrical conductivity;

a core portion configured to protrude from at least one of opposite ends of the tube portion to be bound to the housing and at least partially having electrical conductivity; and a sleeve disposed adjacent to the tube portion in a state of surrounding at least a portion of the core portion and having electrical conductivity, wherein the sleeve is electrically insulated from the core portion and the tube portion, wherein the core portion and the sleeve are configured to be electrically connected to the housing of the wearable electronic device to transmit the electric signal or power, wherein a combination of the tube portion and the core portion is configured to be a first electric wire between the housing of the wearable electronic device and the at least one wearing member, and wherein the sleeve is configured to be a second electric wire between the housing of the wearable electronic device and the at least one wearing member.

11. The wearable electronic device of claim 10, wherein the at least one wearing member is configured to rotate around the coupling pin and relative to the housing.

12. The wearable electronic device of claim 10, wherein the coupling pin further comprises an insulation coating layer formed on at least a part of surfaces of the tube portion and the core portion, and wherein the insulation coating layer is configured to insulate the sleeve from the core portion and the tube portion.

13. The wearable electronic device of claim 10, wherein the coupling pin further comprises:

a first insulation coating layer formed on at least a part of surfaces of the tube portion and the core portion;

a conductive coating layer formed on at least a part of a surface of the first insulating coating layer; and a second insulation coating layer formed on at least a part of a surface of the conductive coating layer, wherein the first insulation coating layer is configured to insulate the sleeve and the conductive coating layer from the core portion and the tube portion, and wherein the second insulation coating layer is configured to insulate the sleeve from the conductive coating layer.

14. The wearable electronic device of claim 13, wherein the conductive coating layer is configured to transmit an electric signal or power, along with at least one of the core portion and the sleeve.

15. The wearable electronic device of claim 10, further comprising:

a detection part configured to detect an electrical resistance value between the core portion and the sleeve, wherein the circuit device is configured to selectively block an electric signal or power transmitted through at least one of the core portion and the sleeve, based on the electrical resistance value detected by the detection part.

16. The wearable electronic device of claim 10, wherein the at least one wearing member comprises a first wearing member detachably coupled to the housing at a predetermined first position and a second wearing member detachably coupled to the housing at a second position different from the predetermined first position, wherein the coupling pin comprises a first coupling pin configured to enable the first wearing member to be detachably coupled to the housing at a first end of the first wearing member and a second coupling pin configured to enable the second wearing member to be detachably coupled to the housing at a second end of the second wearing member, wherein the first coupling pin is configured to transmit an electric signal or power between the circuit device and the electrical component disposed in the first wearing member, or wherein the second coupling pin is configured to transmit an electric signal or power between the circuit device and the electrical component disposed in the second wearing member.

17. The wearable electronic device of claim 16, further comprising:

a plurality of first contact terminals provided in the first wearing member at a position different from the first end of the first wearing member; and a plurality of second contact terminals provided in the second wearing member at a position different from a first end of the second wearing member, wherein the first contact terminals and the second contact terminals are configured to transmit an electric signal or power between the first wearing member and the second wearing member.

18. The wearable electronic device of claim 17, further comprising:

at least one first wire provided in the first wearing member and configured to be electrically connected to the circuit device through the first coupling pin;

at least one second wire provided in the second wearing member and configured to be electrically connected to the circuit device through the second coupling pin;

at least one third wire provided in the first wearing member and configured to sequentially pass via one of the first contact terminals, one of the second contact terminals, the second wire, and the second coupling pin to be electrically connected to the circuit device; and at least one fourth wire provided in the second wearing member and configured to sequentially pass via another one of the second contact terminals, another one of the first contact terminals, the first wire, and the first coupling pin to be electrically connected to the circuit device.

19. The wearable electronic device of claim 18, wherein the electrical component is electrically connected to the circuit device through at least one of the first wire, the second wire, the third wire, and the fourth wire.

* * * * *